United States Patent
Star

(10) Patent No.: US 10,777,055 B1
(45) Date of Patent: Sep. 15, 2020

(54) DISPLAYING EVENT VIDEO ON A DEVICE

(71) Applicant: AMAZON TECHNOLOGIES, INC., Seattle, WA (US)

(72) Inventor: Jessica Star, Playa del Rey, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/269,497

(22) Filed: Feb. 6, 2019

Related U.S. Application Data

(60) Provisional application No. 62/631,862, filed on Feb. 18, 2018.

(51) Int. Cl.
*G08B 13/196* (2006.01)
*G06K 9/00* (2006.01)

(52) U.S. Cl.
CPC ... *G08B 13/19656* (2013.01); *G06K 9/00288* (2013.01)

(58) Field of Classification Search
CPC ............ G08B 13/19656; G06K 9/00288
USPC .................................................. 348/152
See application file for complete search history.

(56) References Cited

U.S. PATENT DOCUMENTS

| | | |
|---|---|---|
| 4,764,953 A | 8/1988 | Chern et al. |
| 5,428,388 A | 6/1995 | Von Bauer et al. |
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 6/2006 | Lee |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |

(Continued)

FOREIGN PATENT DOCUMENTS

| | | |
|---|---|---|
| CN | 2585521 Y | 11/2003 |
| CN | 2792061 Y | 6/2006 |

(Continued)

*Primary Examiner* — Joseph G Ustaris
*Assistant Examiner* — Matthew David Kim
(74) *Attorney, Agent, or Firm* — Lathrop GPM LLP

(57) ABSTRACT

A security device registered to a client device used by a user generates an event message and event video. A network-connected device or the client device determines, based on one or more of characteristics of the event message, event video, location of the client device, connection information of the client device, connection information of the security device, an area boundary, and a connection threshold whether to automatically populate the event video on the client device in full-screen or partial-screen view. Based on this determination, device command is generated controlling display of the event video on the client device.

20 Claims, 20 Drawing Sheets

(56) References Cited

U.S. PATENT DOCUMENTS

| | | | |
|---|---|---|---|
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B1 | 1/2016 | Kasmir et al. | |
| 9,253,455 B1 | 2/2016 | Harrison et al. | |
| 9,258,593 B1 * | 2/2016 | Chen | H04N 21/43615 |
| 9,342,936 B2 | 5/2016 | Scalisi | |
| 9,508,239 B1 | 11/2016 | Harrison et al. | |
| 9,681,165 B1 * | 6/2017 | Gupta | H04N 21/2541 |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2013/0057695 A1 | 3/2013 | Huisking | |
| 2015/0035987 A1 | 2/2015 | Fernandez | |
| 2016/0234372 A1 * | 8/2016 | Yu | G06F 13/385 |
| 2017/0280109 A1 * | 9/2017 | Scalisi | H04N 5/2257 |
| 2018/0091730 A1 * | 3/2018 | Nixon | G08B 13/1966 |
| 2019/0087646 A1 * | 3/2019 | Goulden | G08B 3/10 |

FOREIGN PATENT DOCUMENTS

| | | |
|---|---|---|
| EP | 0944883 B1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A2 | 4/2001 |
| JP | 2002-033839 A2 | 1/2002 |
| JP | 2002-125059 A2 | 4/2002 |
| JP | 2002-342863 A2 | 11/2002 |
| JP | 2002-344640 A2 | 11/2002 |
| JP | 2002-354137 A2 | 12/2002 |
| JP | 2002-368890 A2 | 12/2002 |
| JP | 2003-283696 A2 | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 09-008925 A | 1/2009 |
| WO | WO 199839894 A1 | 9/1998 |
| WO | WO 0113638 A1 | 2/2001 |
| WO | WO 200193220 A1 | 12/2001 |
| WO | WO 2002085019 A1 | 10/2002 |
| WO | WO 2003028375 A1 | 4/2003 |
| WO | WO 2003096696 A1 | 11/2003 |
| WO | WO 2006038760 A1 | 4/2006 |
| WO | WO 2006067782 A1 | 6/2006 |
| WO | WO 2007125143 A1 | 8/2007 |

* cited by examiner

DISPLAYING EVENT VIDEO ON A DEVICE

RELATED APPLICATION

This application claims priority to U.S. provisional patent application No. 62/631,862, filed on Feb. 18, 2018, and incorporated in its entirety herein by reference.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE FIGURES

The various embodiments of the present displaying event video on a device now will be discussed in detail with an emphasis on highlighting the advantageous features. These embodiments depict the novel and non-obvious displaying event video on a device shown in the accompanying drawings, which are for illustrative purposes only. These drawings include the figures described below, in which like numerals indicate like parts.

DETAILED DESCRIPTION OF THE EMBODIMENTS

Figure 1:
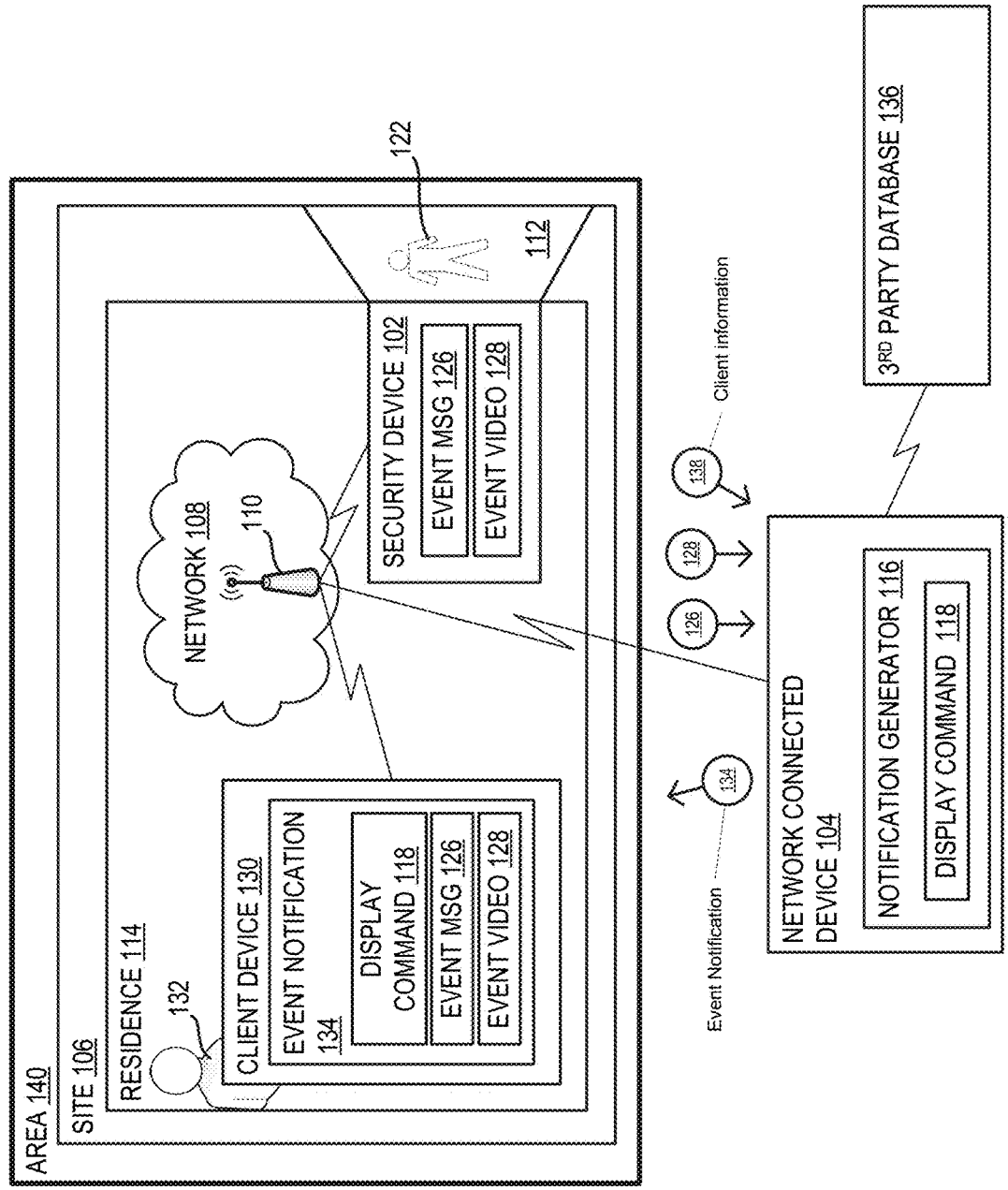
FIG. 1 is a functional block diagram illustrating one example of a system for displaying event video on a device, in an embodiment.

Security devices may be configured to send a notification to a user's client device when a person is detected within an environment monitored by the security device. Typically, the user must respond to the notification to view streaming video of the visitor and/or to open two-way audio communication with the visitor. Accordingly, the user experiences a delay between the time the visitor is first detected by the security device and the time the user first sees and/or speaks to the visitor.

Certain aspects of the present embodiments include the realization that a user may want to immediately see video of an event detected by a security device. The present embodiments solve this problem by automatically displaying the event video on the client device when the event has certain characteristics, such as when the visitor is unexpected (e.g., not recognized from previous visits, recognized in an atypical location, acting in an unexpected manner, etc.), when the event is tactile (e.g., a doorbell button press), or when the user is in a predetermined location or connected to a predetermined network. Advantageously, these aspects allow the user to view the event video immediately without having to interact with the client device to display the event video, thereby enabling the user to react to the event, such as by talking to a person pressing their doorbell or scaring away unwelcome intruders.

Certain aspects of the present embodiments include the realization that data transmission, particularly transmission of an event video, between two or more of (a) a client device, (b) a network-connected device, and (c) a security device, uses limited and costly resources. The present embodiments solve this problem by only transmitting the event video when a display command is generated that causes display of the event video. Advantageously, the present embodiments significantly reduce data transmission and resource usage associated therewith while at the same time allowing the user to view the event video on their client device more quickly.

Certain aspects of the present embodiments include the realization that certain information, such as client device connection information and location information, requires heightened security to prevent or reduce possible security breaches and data privacy issues. At least some of the present embodiments solve this problem by keeping sensitive information, such as location information and connection information of the client device, on the client device without transmitting the sensitive information to a network-connected device. Advantageously, this aspect enables the present embodiments to maintain increased security over sensitive information.

Certain aspects of the present embodiments include the realization that it may be useful for a user to have automatic full-screen video display, partial-screen video display, or no video display (e.g., notification only) of an event detected by a security device at their residence on a client device when the user is not present at the location of the security device. The present embodiments solve this problem by allowing the user to configure the video display and the area on the client device. Advantageously, when a visitor is detected by the security device, the event notification and/or video is displayed on the client device according to the user's configuration.

Certain aspects of the present embodiments include the realization that third-party databases, such as those including facial images that have been designated as possibly suspicious, may not be coupled to a multitude of client devices because of potential security risks, thereby limiting the accessibility of the third-party database to the client devices. The present embodiments solve this problem by allowing a third-party database to couple to a network-connected device, such as a hub, which then serves as an interface between the multiple client devices and the third-party database. This configuration advantageously enables the resources of the third-party database to be accessible to the multiple client devices without sacrificing cost resources and security of the third-party database.

The following detailed description describes the present embodiments with reference to the drawings. In the drawings, reference numbers label elements of the present embodiments. These reference numbers are reproduced below in connection with the discussion of the corresponding drawing features.

FIG. 1 is a functional block diagram illustrating one example of a system 100 for displaying event video on a device. The system 100 includes a security device 102 (also referred to herein as an audio/video (A/V) recording and communication device 1680, see FIG. 16) configured at a site 106 (e.g., a geographic location). The security device 102 is in communication with a network-connected device 104 via a network 108 that includes a network hub 110.

The security device 102—which may be, for example, a video doorbell (FIG. 20) or a security camera (FIG. 21) discussed in detail below—is configured to monitor an environment 112 at the site 106, for example to detect a visitor 122. The site 106 may include a residence 114 where the environment 112 is an entryway, for example, or another area associated with the residence 114. The site 106 may have more than one security device 102 without departing from the scope of the present embodiments.

The security device 102 generates an event message 126, when triggered by an event (e.g., the visitor 122 enters the environment 112), that defines a type of the event (e.g., "motion detected by security device"). The security device 102 may also capture an event video 128 of the environment 112 when triggered by the event, and may stream the event video 128 to the network-connected device 104 via the network 108. The network-connected device 104 includes a notification generator 116 that generates a display command 118 in response to receipt of the event message 126 from the security device 102. The network-connected device 104 then sends an event notification 134, including the display command 118 and one or both of the event message 126 and the event video 128, to a client device 130 for controlled display of one or both of the event message 126 and the event video 128 according to the display command 118. The event video 128 may be a live video stream, or a video stream captured and temporarily stored by the security device 102, or at the network-connected device 104, including video of the event triggering generation of the event message 126.

The display command 118 has one or more instructions for controlling display of one or both of the event message 126 and the event video 128 at the client device 130 associated with (e.g., registered to) the security device 102. The display command 118 may be, for example, generated based on a variety of factors including, but not limited to: information within a third-party database 136 and client device information 138. The information of the third-party database 136 may be used to determine whether the visitor 122 is unexpected or not, as discussed in further detail below. The client device information 138 may be transmitted from the client device 130 to the network-connected device 104 and, according to embodiments, identifies parameters of the client device 130, such as whether the client device 130 is within a predefined area 140 and/or whether the security device 102 and the client device 130 are connected to each other or connected to the same network 108, such as via the network hub 110.

In certain embodiments, the security device 102 communicates the event video 128 to the network-connected device 104 at the same time, or at different times, as the event message 126. For example, a first communication from the security device 102 to the network-connected device 104 may include the event message 126. Then, if the command 118 defines that the client device 130 is to immediately play the event video 128, the network-connected device 104 may send a second communication including the event video 128, and the network-connected device 104 may transmit the display command 118, the event message 126, and the event video 128 to the client device 130. These embodiments address at least the realization that transmission of the event video 128 between two or more of (a) the client device 130, (b) the network-connected device 104, and (c) the security device 102 uses limited and costly resources. These embodiments solve this problem by only transmitting the event video 128 when the display command 118 indicates that the client device 130 is to immediately display the event video 128. Advantageously, as compared to always sending the event video 128, the present embodiments reduce data transmission and resource usage associated therewith while allowing a user 132 of the client device 130 to view the event video 128 more quickly. Moreover, when the client device 130 is to display only the event message 126, the event video 128 is not communicated unnecessarily.

Figure 2:
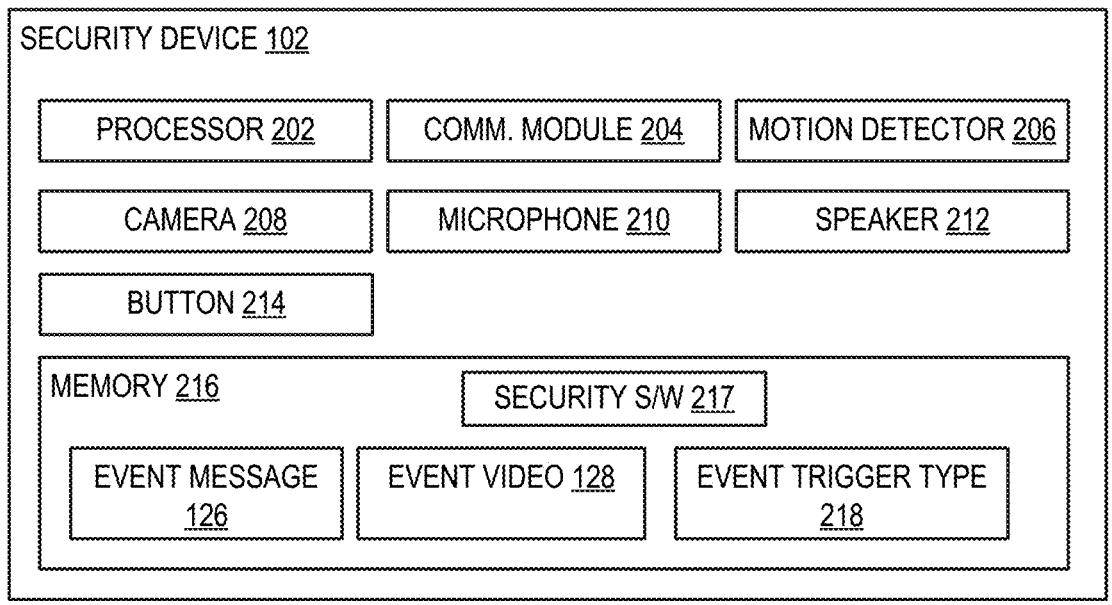
FIG. 2 is a functional block diagram illustrating one example of the security device of FIG. 1 in further detail.

FIG. 2 is a functional block diagram illustrating one example of the security device 102 of FIG. 1, in further detail. The security device 102 includes a processor 202, a communication module 204, a motion detector 206, a camera 208, a microphone 210, a speaker 212, a button 214, and a memory 216. Components within the security device 102 may be, for example, in electronic communication via a data communication bus.

The processor 202 can include one or more processors, such as one or more microprocessors, and/or one or more supplementary co-processors, such as math co-processors. The communication module 204 may include one or more transceiver modules configured to communicate and receive data, for example using one or more protocols and/or technologies like GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology. Data communicated to and from the security device 102 is communicated and received via the communication module 204.

The motion detector 206 may include one or more infrared sensors (such as a passive infrared (PIR) sensor or other IR sensor), laser motion sensors, or other circuitry capable of detecting motion within the environment 112 (FIG. 1). The camera 208 may include one or more image capture devices capable of capturing an image, or sequence of images (e.g., video), of the environment 112 (FIG. 1). The microphone 210 is configured to capture audio from the environment 112 (FIG. 1). For example, the microphone 210 captures audio generated by the visitor 122 within the environment 112.

The speaker 212 is configured to emit audio to the environment 112 (FIG. 1). For example, the speaker 212 emits audio based on the user 132 interacting with the client device 130 and communicated to the security device 102 via a communication link (which may be the network 108) between the security device 102 and the client device 130. In another example, the speaker 212 emits a siren or another audible sound to prompt the visitor 122 to leave the environment 112. The button 214 may be, for example, a doorbell button in embodiments where the security device 102 is a doorbell.

The memory 216 includes one or both of volatile memory, such as random access memory (RAM), and non-volatile memory, such as read-only memory (ROM), hard drives, flash memory, or any other suitable memory/storage element. The memory 216 may include removable memory elements, such as a CompactFlash card, a MultiMediaCard (MMC), and/or a Secure Digital (SD) card. In certain embodiments, the memory 216 includes a combination of magnetic, optical, and/or semiconductor memory, and may include, for example, RAM, ROM, a flash drive, and/or a hard disk or drive. The memory 216 is shown storing security software 217 that includes machine-readable instruction that, when executed by the processor 202, operate the security device 102 to generate and store the event message 126 and the event video 128 (e.g., temporarily within a buffer) in the memory 216. The security software 217 may also determine an event trigger type 218 based upon which of the motion detector 206, the camera 208, the microphone 210, and the button 214, triggered the security device 102. The event trigger type 218 may be, for example, any one or more of detection of motion within the environment 112 by the motion detector 206, identification of a visitor (e.g., the visitor 122) within images of the environment 112 captured by the camera 208, detection of audio within the environment 112 by the microphone 210, a press of the button 214 by the visitor 122, or other triggers either tactile or non-tactile. Non-tactile events may occur when motion is sensed within the environment 112, for example. The event message 126 and the event video 128 are communicated to the network-connected device 104 via the communication module 204. The security software 217 may then use the communication module 204 to communicate one or more of the event message 126, the event video 128, and the event trigger type 218 to the network connected device 104.

Figure 3:
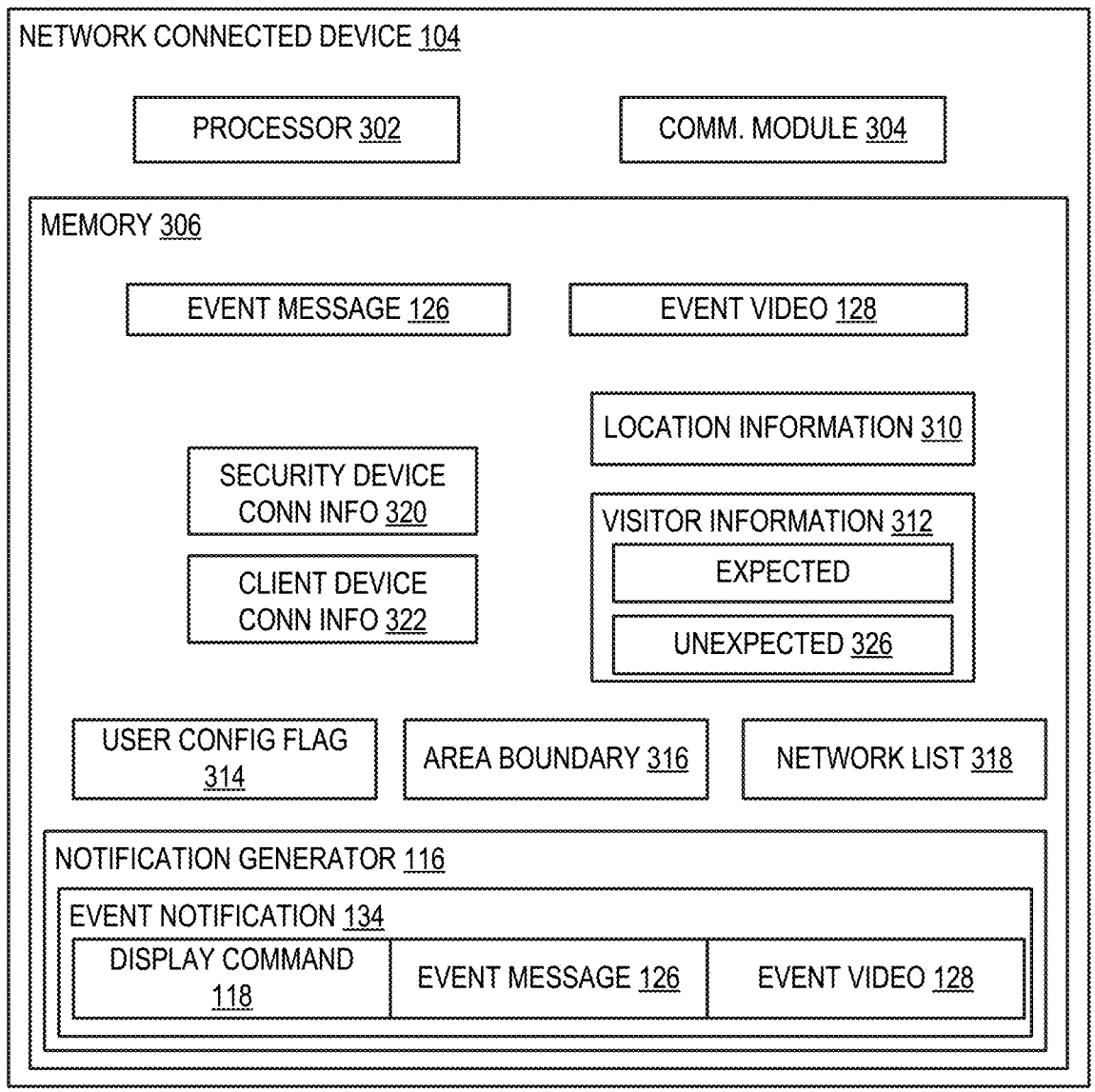
FIG. 3 is a functional block diagram illustrating one example of the network-connected device of FIG. 1 in further detail.

FIG. 3 is a functional block diagram illustrating one example of the network-connected device 104 of FIG. 1, in further detail. The network-connected device 104 may be any one or more of a back-end cloud server, a smart home automation hub, a premises security hub co-located at the site 106 with the security device 102, or another similar device that is part of the network hub 110. The network-connected device 104 includes one or more of a processor 302, a communication module 304, and a memory 306. Components within the network-connected device 104 may be in electrical communication with each other via a data communication bus (not shown).

The processor 302 includes one or more digital processors, such as one or more microprocessors, and/or one or more supplementary co-processors, such as math co-processors. The communication module 304 may include one or more transceiver modules configured for communicating and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or other protocol and/or technology. Data communicated to (e.g., the event message 126 and the event video 128) and from (e.g., the event notification 134) the network-connected device 104 is communicated and received via the communication module 304.

The memory 306 includes one or both of volatile memory, such as random access memory (RAM), as well as non-volatile memory, such as read-only memory (ROM), hard drives, flash memory, or another suitable memory/storage element. The memory 306 may include removable memory elements, such as a CompactFlash card, a MultiMediaCard (MMC), and/or a Secure Digital (SD) card. In certain embodiments, the memory 306 includes a combination of magnetic, optical, and/or semiconductor memory, and may include, for example, RAM, ROM, a flash drive, and/or a hard disk or drive.

The notification generator 116 receives the event message 126 and the event video 128 from the security device 102 and stores them within the memory 306. The memory 306 further stores the notification generator 116 as computer readable instructions that, when executed by the processor 302, operate to generate the event notification 134 and the display command 118 based upon one or more of security device connection information 320, client device connection information 322, location information 310, visitor information 312, a user-configurable flag 314, an area boundary 316, and a network list 318. Upon receipt of the event message 126, the notification generator 116 generates the display command 118. In some embodiments, the display command 118 is automatically generated to control the display device 130 to populate the event video 128 in full-screen mode without further interaction by the user 132 with the client device 130. In some embodiments, the notification generator 116 generates the display command 118 to control the client device 130 to populate the event video 128 in partial-screen mode without further interaction by the user 132 with the client device 130.

In some embodiments, the area boundary 316 may define a geographical boundary. For example, as described below, when the client device 130 is located inside the area boundary 316, then the display command 118 may cause automatic full-screen population, and when the client device 130 is located outside the area boundary 316, then the display command 118 may cause automatic partial-screen population.

In some embodiments, the network list 318 may comprise a list of one or more networks. For example, as described below, when the client device 130 is connected to one of the networks in the network list 318, then the display command 118 may cause automatic full-screen population, and when the client device 130 is not connected to one of the networks in the network list 318, then the display command 118 may cause automatic partial-screen population.

The security device connection information 320 includes information communicated from the network hub 110 indicating that the security device 102 is coupled to the network hub 110. The security device connection information 320 may be transmitted to the network-connected device 104 from the network hub 110 or the security device 102, or may be requested by the network-connected device 104 when the event message 126 is received.

The client device connection information 322 is communicated from the client device 130 to the network-connected device 104, and defines the network with which the client device 130 is currently linked, or the network with which the client device 130 was most recently connected. The client device connection information 322 may be received via the network hub 110, for example, when the client device 130 is connected to the network 108. The client device connection information 322 may also be received via a communication link between the client device 130 and the network-connected device 104 other than the network 108 (e.g., via an Internet or cellular data connection), and may thereby define a remote network (e.g., another Wi-Fi or cellular network, or a Bluetooth (or other short-range communication protocol) network such as a vehicle network). The client device connection information 322 may be transmitted to the network-connected device 104 from the network hub 110 or the client device 130, or may be requested by the network-connected device 104 when the event message 126 is received.

In one example, when the security device connection information 320 and the client device connection information 322 stored in the memory 306 indicate that each of the security device 102 and the client device 130 are connected to the same network (e.g., the network 108), the notification generator 116 generates the display command 118 for automatic full-screen population of the event video 128 on the client device 130. In another example, the notification generator 116 generates the display command 118 for automatic full-screen population when the client device connection information 322 indicates that the client device 130 is directly connected to the security device 102 (e.g., via a short-range communication protocol). In another example, the notification generator 116 generates the display command 118 for automatic full-screen population when the client device connection information 322 indicates that the client device 130 is connected to a network matching a network in the network list 318. In another example, generation of the display command 118 for automatic partial-screen population may occur when the security device connection information 320 and the client device connection information 322 indicate that each of the security device 102 and the client device 130 are connected to different networks. In another example, generation of the display command 118 for automatic partial-screen population may occur when the client device connection information 322 indicates that the client device 130 is not connected to a network matching one of the networks in the network list 318.

The location information 310 includes the current, or most recent, determined location of the client device 130. The location information 310 may be determined at the client device 130 using a variety of methods, including, but not limited to, data generated by global navigation satellite system (GNSS) (e.g., Global Positioning System (GPS), GLONASS, Galileo, BeiDou, BeiDou-2) circuitry in the client device 130, cellular tower triangulation of the client device 130, and association by the network-connected device 104, of the client device 130, with a location of another object (such as by determining the location of the client device 130 as the location of the network hub 110 or the security device 102 when the network-connected device 104 identifies that the client device 130 is connected either to the same network 108 as the security device 102, or directly connected to the security device 102). In embodiments, the location information 310 is communicated to the network-connected device 104 from the network hub 110 if the client device 130 is connected to the network 108. In embodiments, the location information 310 is communicated to the network-connected device 104 from the security device 102 when the client device 130 is connected to the security device 102. In embodiments, the location information 310 is communicated to the network-connected device 104 from the client device 130 via a communication link between the client device 130 and the network-connected device 104 separate from the network 108 (e.g., via an Internet or cellular data connection).

The location information 310 may additionally be requested by the network-connected device 104. For example, the network-connected device 104 may communicate a first message to the client device 130 requesting a current geographic location of the client device 130. The network-connected device 104 may then receive, in response to the first message, a second message from the client device 130 indicating the current geographical location of the client device 130.

In another example, generation of the display command 118 causes automatic full-screen population when the location information 310 indicates that the client device 130 is located inside the area boundary 316. In another example, generation of the display command 118 for automatic partial-screen population may occur when the location information 310 indicates that the client device 130 is not located inside the area boundary 316.

The visitor information 312 may include an expected visitors database 324 and/or an unexpected visitors database 326. In one example, generation of the display command 118 causing automatic full-screen population may occur when facial information (or other identifying information) of an isolated face of the visitor 122 detected at the security device 102 matches an entry in the unexpected visitors database 326. In another example, generation of the display command 118 for automatic partial-screen population may occur when facial information (or other identifying information) of the visitor 122 detected at the security device 102 matches an entry in the expected visitors database 324. The visitor information 312 may be generated based on data received at the network-connected device 104 from one or more of the client device 130, the security device 102, the third-party database 136, or a back-end server containing the visitor information 312. In embodiments, the visitor information 312 is based on historical data of events occurring at the security device 102. For example, when a face of the visitor 122 has been captured (either once or at least a threshold number of times) by the security device 102 in previous event video, the network-connected device 104 may determine that the visitor 122 is known (or otherwise expected), and the facial parameters (e.g., facial image, extracted facial features, etc.) of the visitor 122 may be stored in the expected visitors database 324. Conversely, when the face of the visitor 122 has not been previously captured (either once or a threshold number of times) by the security device 102 in previous event video, the network-connected device 104 may determine that the visitor 122 is unknown (or otherwise unexpected), and the facial parameters (e.g., facial image, extracted facial features, etc.) of the visitor 122 may be stored in the unexpected visitors database 326. In some embodiments, the facial parameters (e.g., facial images and/or facial features) stored in one or both of the expected visitors database 324 and the unexpected visitors database 326 do not include a name or other identity of the visitor, and are used only within the system 100 to determine whether the visitor is, or is not, expected at the site 106.

As another example, when the visitor 122 has previously been detected, and input by the user 132 to the client device 130 indicates that the visitor 122 is known (or otherwise expected, etc.), then the facial parameters (e.g., facial image, extracted facial features, etc.) of the visitor 122 may be stored in the expected visitors database 324. Conversely, when the visitor 122 has previously been detected, and input by the user 132 to the client device 130 indicates that the visitor 122 is unknown (or otherwise unexpected, etc.), then the facial parameters (e.g., facial image, extracted facial features, etc.) of the visitor 122 may be stored in the unexpected visitors database 326.

As another example, facial signatures of an isolated face of people identified as a criminal in the third-party database 136—such as a convicted criminal, convicted sex-offender, and/or person wanted by the police—are downloaded into the memory 306 from the third-party database 136 as unexpected visitors database 326. As another example, the third-party database 136 may be a database associated with a neighborhood in which the residence 114 is located and the expected visitors database 324 and unexpected visitors database 326 may include expected/unexpected designations by persons/visitors identified within video clips at security devices located within other sites of the neighborhood and published to the third-party database 136. The third-party database 136 may be internal to the network-connected device 104 (such that the visitor information 312 and the third-party database 136 are the same) without departing from the scope of the present embodiments.

Figure 4:
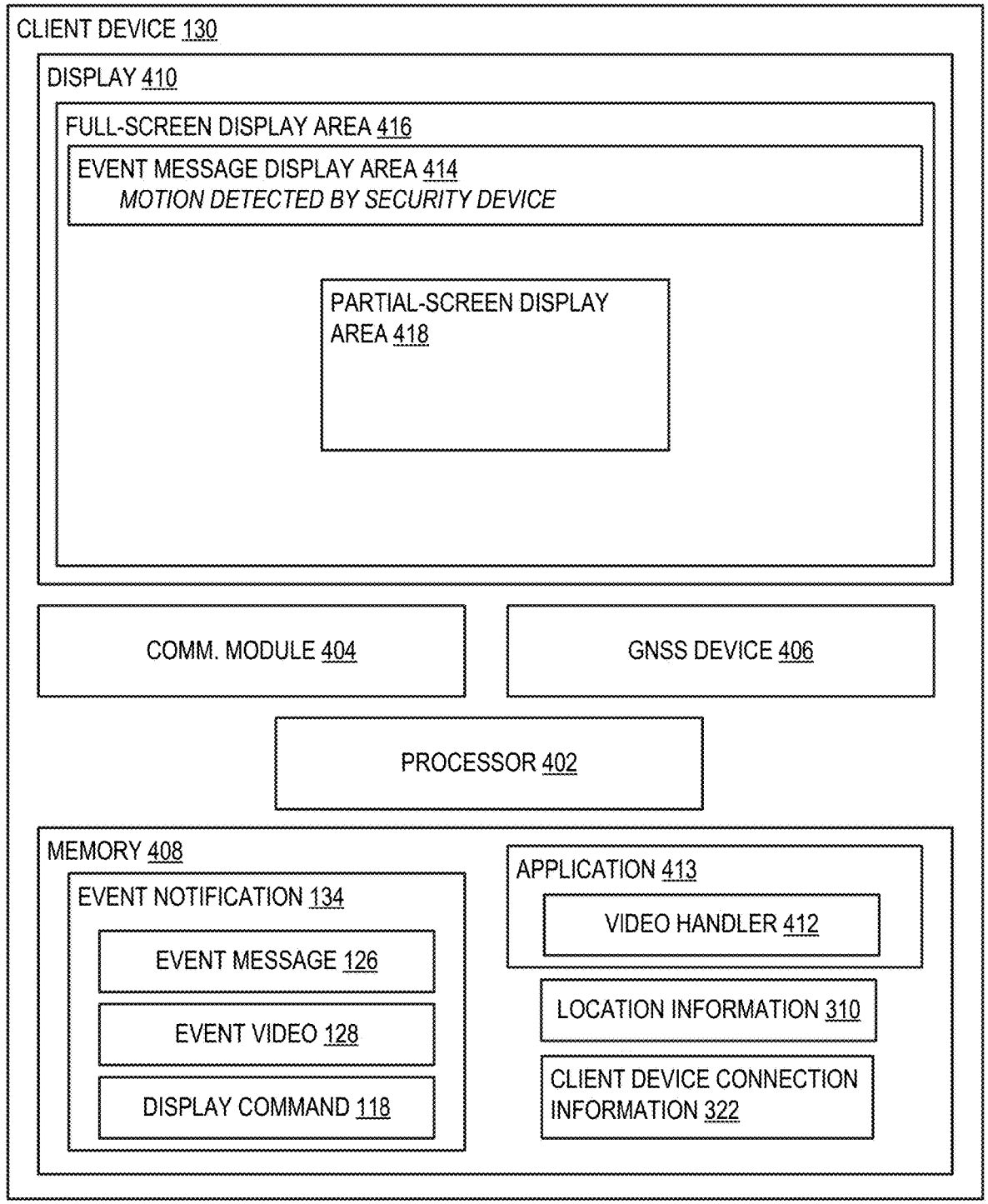
FIG. 4 is a functional block diagram illustrating one example of the client device of FIG. 1 in further detail.

The user-configurable flag 314 includes settings configured by the user 132 via interaction with a portal to the network-connected device 104 (either through an application on a client device 130, such as the application 413 of FIG. 4, or a remote device such as a computer, a tablet, or another device). For example, the user-configurable flag 314 may include an override setting that causes the network-connected device 104 to generate the display command 118 to display the event video 128 as a full-screen display on the client device 130, regardless of the characteristics of the security device connection information 320, the client device connection information 322, the location information 310, the visitor information 312, the area boundary 316, and/or the network list 318.

In another example, generation of the display command 118 causing automatic full-screen population may occur when the user-configurable flag 314 indicates that all event video 128 should be automatically populated as full-screen on the client device 130. In another example, generation of the display command 118 for automatic partial-screen population may occur when the user-configurable flag 314 indicates that all event video 128 should be automatically populated as partial-screen on the client device 130.

The area boundary 316 may be user configurable. For example, the user 132 may configure the area boundary 316 via interaction with a portal to the network-connected device 104 (either through an application on a client device 130, such as the application 413 of FIG. 4, or a remote device such as a computer, a tablet, or another device). For example, the area boundary 316 may be configured such that, whenever the client device 130 is located in the area 140, the event video 128 is to automatically populate in full-screen display on the client device 130. The area boundary 316 need not be associated only with the site 106, or the residence 114 at which the security device 102 is located, but instead may be, for example, any geo-fence, such as a neighbor location, a remote location (e.g., a user's workplace) or any other geo-location.

The network list 318 may be user configurable. For example, the user 132 may configure the network list 318 via interaction with a portal to the network-connected device 104 (either through an application on a client device 130, such as the application 413 of FIG. 4, or a remote device such as a computer, a tablet, or another device). For example, the network list 318 may be configured such that whenever the client device 130 is connected to a predefined network in the network list 318, the event video 128 is to automatically populate in full-screen display on the client device 130. The predefined network may be the network 108. In embodiments, the predefined network may be a remotely located network, such as a workplace Internet connection, any Wi-Fi connection (e.g., non-cellular), or a connection to a remote device, such as a vehicle Bluetooth or cellular network.

In another example, generation of the display command 118 causing automatic full-screen population may occur based on the event identified in the event message 126, for example when the event is triggered based on a tactile trigger, such as a press of the button 214. In another example, generation of the display command 118 for automatic partial-screen population may occur based on the event identified in the event message 126, such as when the event is triggered during a given time of day, such as when the user typically leaves the residence 114.

The display command 118 may further define a quality of video for playback on the client device 130, which may be based on full- or partial-screen resolution, and/or the bandwidth availability defined by one or both of the security device connection information 320 and the client device connection information 322.

The display command 118 may also define display parameters associated with the event message 124. For example, the display command 118 may instruct the client device 130 to overlay the event message 124 for a given period of time over the full-screen display of the event video 128.

The notification generator 116 may invoke a classifier engine to assign a classification to the event message 126 and the event video 128. As such, the notification generator 116 may include a convolutional neural network trained to recognize patterns within the event message 126 or the event video 128. For example, the classification may indicate patterns of unexpected actions identified within the event video 128, such as when the visitor 122 peers through windows, vandalizes property, takes photographs, and/or steals packages.

The notification generator 116 may package the generated display command 118, the event message 126, and the event video 128 as the event notification 134 for transmission to the client device 130. In some embodiments, particularly where the display command 118 indicates full-screen display of the event video 128, the event video 128 may be communicated in high quality video (e.g., as high as possible). In other embodiments, the event video 128 may be communicated in a lower quality than recorded by the security device 102. In embodiments, instead of communicating relayed event video, the event video 128 may identify connection parameters such that the security device 102 and the client device 130 may connect directly together for transmission of the event video 128 as a video stream.

FIG. 4 is a functional block diagram illustrating one example of the client device 130 of FIG. 1, in further detail. The client device 130 includes a processor 402, a communication module 404, a GNSS (global navigation satellite system) device 406 (e.g., Global Positioning System (GPS), GLONASS, Galileo, BeiDou, BeiDou-2), a memory 408, and a display 410. The processor 402 includes one or more processors, such as one or more microprocessors, and/or one or more supplementary co-processors, such as math co-processors. The client device 130 in association with the security device 102 may be registered with the network-connected device 104.

The communication module 404 may include one or more transceiver modules configured for communicating and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology. Data communicated to and from the client device 130 is communicated and received via the communication module 404. Information regarding external devices, such as the network hub 110 and/or the security device 102, and networks, such as the network 108 to which the client device 130 is connected, are stored in the memory 408 as client device connection information 322, and then communicated, either directly or through an intermediate device (e.g., the network hub 110), to the network-connected device 104 for storage in the memory 306.

The GNSS device 406 includes location identification circuitry configured to interface with a global positioning satellite to determine the location of the client device 130. The determined location is stored in the memory 408 as the location information 310 and may be communicated (periodically, upon request by the network-connected device 104, or as the location of the client device 130 changes) to the network-connected device 104 (either directly or indirectly via a network hub, such as the network hub 110) for storage in the memory 306.

The memory 408 may include one or both of volatile memory, such as random access memory (RAM), as well as non-volatile data storage, such as read-only memory (ROM), hard drives, flash memory, or any other suitable memory/storage element. The memory 408 may include removable memory elements, such as a CompactFlash card, a MultiMediaCard (MMC), and/or a Secure Digital (SD) card. In certain embodiments, the memory 408 includes a combination of magnetic, optical, and/or semiconductor memory, and may include, for example, RAM, ROM, a flash drive, and/or a hard disk or drive.

The memory 408 stores the event notification 134 received from the network-connected device 104 and including the event message 126, the event video 128, and the display command 118. The application 413 includes computer readable instructions that, when executed by the processor 402, are configured to implement a video handler 412 that displays one or both of the event message 126 and the event video 128 on the display 410 according to the display command 118. As such, the video handler 412 may be a video player driver that operates under control of the display command 118 to display the event video 128. The application 413 may also serve as a portal for the user 132 to access aspects of the security device 102 and the network-connected device 104, such as to set the user-configurable flag 314, to set or adjust the area boundary 316, to configure the network list 318, to access previously stored event videos, to set or adjust settings of the security device 102, to configure other security devices registered to the user 132, and the like.

In the embodiments illustrated in FIGS. 1-4, because the display command 118 is generated in the network-connected device 104, the display of the client device 130 is remotely controlled from the network-connected device 104. As shown in FIG. 4, the display 410 of the client device 130 may include an event message display area 414, a full-screen display area 416, and a partial-screen display area 418. The location and size of the display areas 414, 416, and 418 are not limited in scope to the illustration shown in FIG. 4, but may be relocated and resized according to a desired configuration. For example, the full-screen display area 416 may not overlay the entire display area of the display 410, but, in embodiments, may just be a larger display area than the partial-screen display area 418. When the display command 118 indicates that the event video 128 is to be played full screen, then the video handler 412 operates to display the event video 128 in the full-screen display area 416. When the display command 118 indicates that the event video 128 is to be played partial screen, then the video handler 412 operates to display the event video 128 in the partial-screen display area 418. When the display command 118 indicates that the event video 128 is not to be displayed, or the event notification 134 does not include the event video 128, then the event message 126 is only displayed in the event message display area 414. Moreover, the event message display area 414 may overlap the full-screen display area 416 as shown in FIG. 4. Alternatively, the event message display area 414 may not overlap either of the full-screen display area 416 or the partial-screen display area 418, and may also overlap the partial-screen display area 418 without departing from the scope of the present embodiments.

Figure 5:
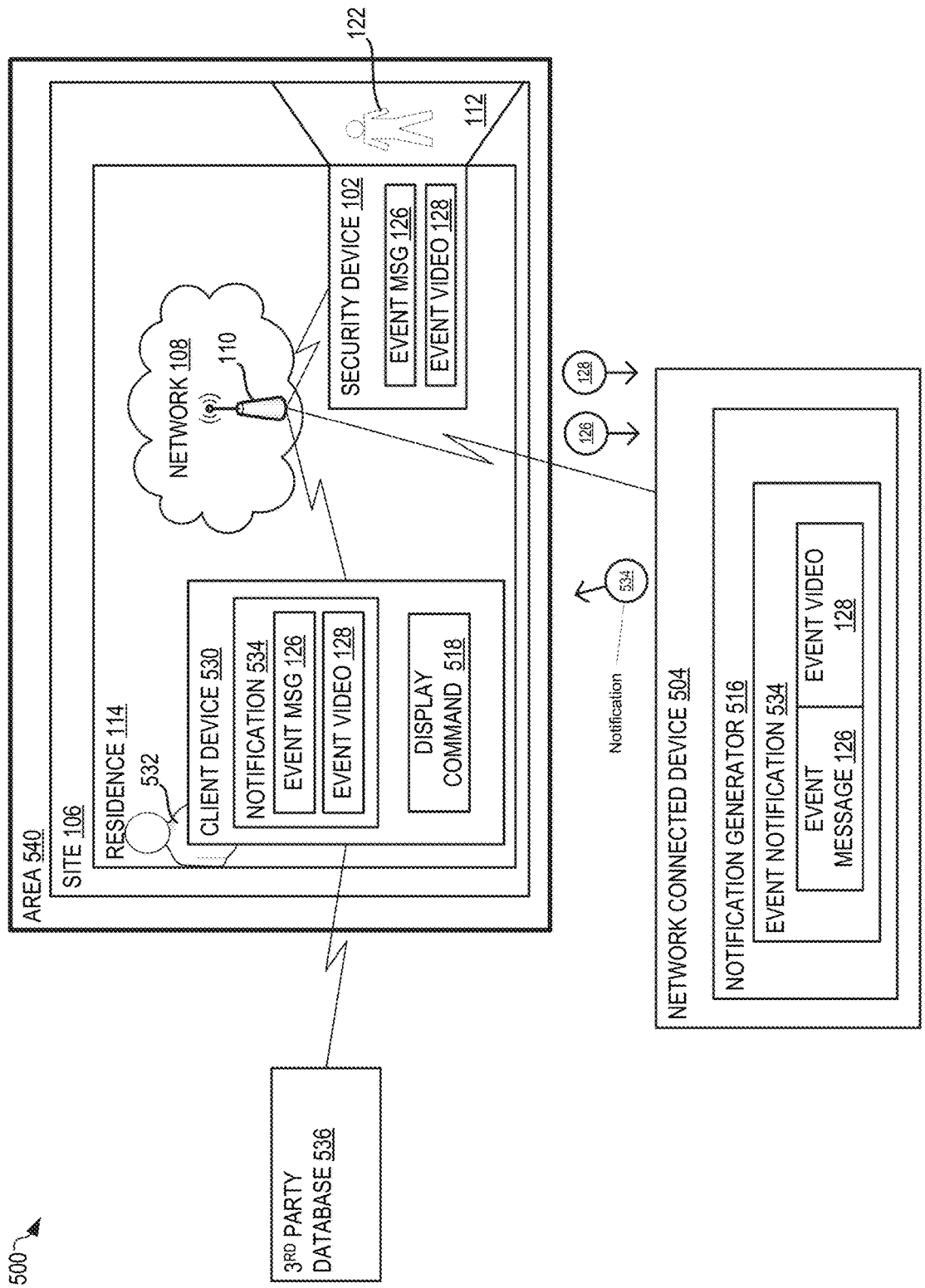
FIG. 5 is a functional block diagram illustrating another example of a system for displaying event video on a device, in another embodiment.

FIG. 5 is a functional block diagram illustrating another example of a system 500 for displaying event video on a device. The system 500 includes the security device 102 located at the residence 114 of the site 106 (discussed above with respect to FIGS. 1-4). A user 532 and his or her client device 530 are registered with the security device 102. The security device 102 generates one or both of the event message 126 and the event video 128 upon detection of the visitor 122 in the environment 112, as discussed above with respect to FIGS. 1-4. The security device 102 is connected to the network 108 hosted by the network hub 110 (each discussed above with respect to FIGS. 1-4) to communicate one or both of the event message 126 and the event video 128 to a network-connected device 504. The system 500 controls how the event video 128 is displayed on the client device 530 based a display command 518 generated at the client device 830.

The network-connected device 504 includes a notification generator 516. The notification generator 516 includes computer readable instructions stored in memory that when executed by a processor operate to generate the event notification 534 in response to receipt of the event message 126 from the security device 102. The network-connected device 504 sends the event notification 534 to a client device 530 of a user 532. The client device 530 generates the display command 518 that includes one or more instructions for controlling display of one or both of the event message 126 and the event video 128 on the client device 530. The display command 518 is, for example, generated based upon one or more of the event notification 534, location information of the client device 530, connection information of the client device 530, connection information of the security device 102, and information from a third-party database 536 with which the client device 530 is in data communication.

In certain embodiments, the security device 102 communicates the event video 128 to the network-connected device 504 at the same time, or at a different time, as the event message 126. For example, a first communication from the security device 102 to the network-connected device 504 may include the event message 126. Then, when the display command 518 defines that the client device 530 is to immediately play the event video 128, the network-connected device 504 or the client device 530 may request from the security device 102 a second communication including the event video 128. The event notification 534 may then be communicated to the client device 130 including the event message 126, and the event video 128. These embodiments address the realization that transmission of the event video 128 between two or more of (a) the client device 530, (b) the network-connected device 504, and (c) the security device 102, uses limited and costly resources. These embodiments solve this problem by only transmitting the event video 128 when the display command 518 indicates that the client device 530 is to immediately display the event video 128. Advantageously, as compared to when always sending the event video 128, the present embodiments reduce data transmission and resource usage associated therewith while allowing the user 532 to view the event video 128 more quickly. Moreover, when the display command 518 indicates that the client device 530 is to display only the event message 126, then the event video 128 is not communicated unnecessarily.

Figure 6:
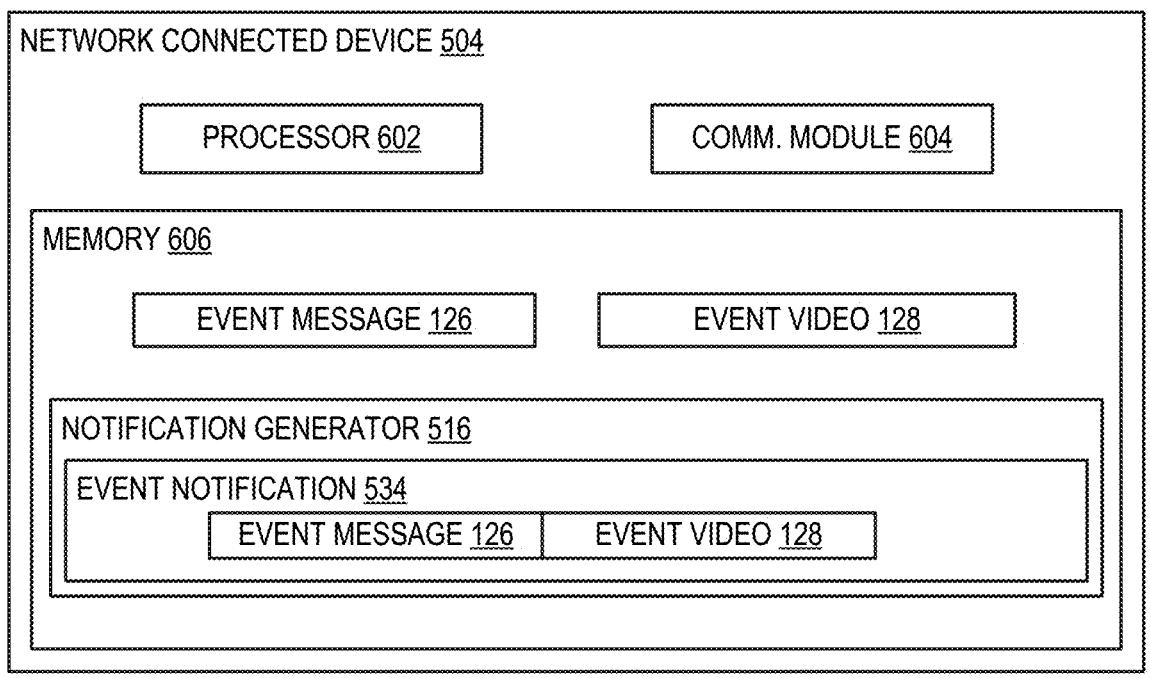
FIG. 6 is a functional block diagram illustrating one example of the network-connected device of FIG. 5 in further detail.

FIG. 6 is a functional block diagram illustrating one example of the network-connected device 504 of FIG. 5, in further detail. The network-connected device 504 may be any one or more of a cloud server, a smart home hub, a premises security hub co-located at the site 106 with the security device 102 or another similar device, or it may be part of the network hub 110. The network-connected device 504 includes a processor 602, a communication module 604, and a memory 606. Components within the network-connected device 504 may be in electrical communication with each other via a data communication bus (not shown).

The processor 602 may include one or more processors, such as one or more microprocessors, and/or one or more supplementary co-processors, such as math co-processors. The communication module 604 may include one or more transceiver modules configured for communicating and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology. Data communicated to (e.g., the event message 126 and the event video 128) and from (e.g., the event notification 534) the network-connected device 504 is communicated and received via the communication module 604.

The memory 606 includes one or both of volatile memory, such as random access memory (RAM), as well as non-volatile memory, such as read-only memory (ROM), hard drives, flash memory, or any other suitable memory/storage element. The memory 606 may include removable memory elements, such as a CompactFlash card, a MultiMediaCard (MMC), and/or a Secure Digital (SD) card. In certain embodiments, the memory 606 includes a combination of magnetic, optical, and/or semiconductor memory, and may include, for example, RAM, ROM, a flash drive, and/or a hard disk or drive.

Figure 7:
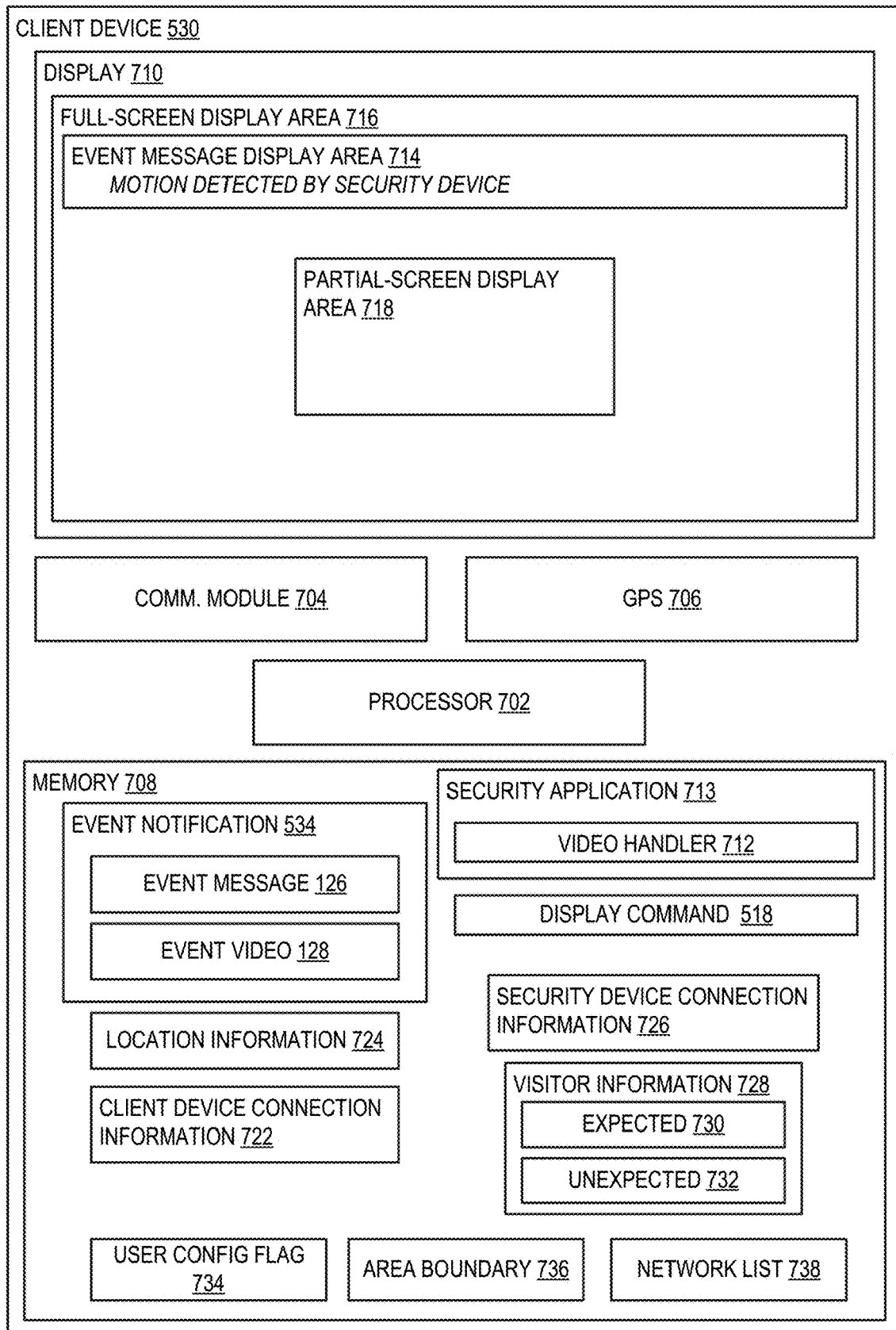
FIG. 7 is a functional block diagram illustrating one example of the client device of FIG. 5 in further detail.

The event message 126 and the event video 128 received at the network-connected device 504 from the security device 102 are stored within the memory 606. The memory 606 further stores the notification generator 516 as computer readable instructions that, when executed by the processor 602, operate to generate the event notification 534, which, in the embodiment shown in FIGS. 5-7, is a relay of the event message 126 and the event video 128. In embodiments, instead of communicating relayed event video, the event notification 534 may identify connection parameters such that the security device 102 and the client device 530 may connect directly together for transmission of the event video 128 as a live video stream.

FIG. 7 is a functional block diagram illustrating one example of the client device 530 of FIG. 5, in further detail. The client device 530 includes a processor 702, a communication module 704, a GNSS (global navigation satellite system) device 706 (e.g., Global Positioning System (GPS), GLONASS, Galileo, BeiDou, BeiDou-2), a memory 708, and a display 710. The processor 702 may include one or more processors, such as one or more microprocessors, and/or one or more supplementary co-processors, such as math co-processors.

The communication module 704 may include one or more transceiver modules configured for communicating and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology. Data communicated to (e.g., the event notification 534) and from the client device 530 is communicated and received via the communication module 704. Information regarding connection of the client device 530 to external devices, such as the network hub 110 and/or the security device 102, and/or connection of the client device 530 to networks, such as the network 108, is stored in the memory 708 as client device connection information 722. The memory 708 may additionally store security device connection information 726, which is received from the network hub 110 and identifies the network 108 to which the security device 102 is connected.

The GNSS 706 includes location identification circuitry configured to interface with a global positioning satellite to determine the location of the client device 530. The determined location is stored in the memory 708 as the location information 724.

The memory 708 includes one or both of volatile memory, such as random access memory (RAM), as well as non-volatile memory, such as read-only memory (ROM), hard drives, flash memory, or any other suitable memory/storage element. The memory 708 may include removable memory elements, such as a CompactFlash card, a MultiMediaCard (MMC), and/or a Secure Digital (SD) card. In certain embodiments, the memory 708 may include a combination of magnetic, optical, and/or semiconductor memory, and may include, for example, RAM, ROM, a flash drive, and/or a hard disk or drive.

The memory 708 stores the event notification 534, received at the client device 530 from the network-connected device 504, including the event message 126 and the event video 128. The memory 708 also stores a security application 713 as computer readable instructions that, when executed by the processor 702, generate the display command 518 and implement a video handler 712 that displays one or both of the event message 126 and the event video 128 within the display 710 according to the display command 518. The video handler 712 may be a video player driver or instructions for a video driver of the client device 530 that is instructed by the display command 518 to display one or both of the event message 126 and the event video 128. The security application 713 may serve as a portal for the user 532 to access aspects of the security device 102 and the network-connected device 504, such as setting of a user-configurable flag 734, an area boundary 736, a network list 738, access to previously stored event videos, settings of the security device 102, other security devices registered to the user 132, and the like.

The display command 518 is generated by the security application 713 to control display of one or both of the event message 126 and the event video 128 based on one or more of the client device connection information 722, the security device connection information 726, the location information 724, visitor information 728, the user-configurable flag 734, the area boundary 736, and the network list 738, each of which are stored in the memory 708. In embodiments, the display command 518 is generated to control the population of the event video 128 in full-screen mode on the display 710 without the user 532 interacting with the client device 530. In embodiments, the display command 518 is automatically generated by the security application 713 to control the client device 530 to populate the event video 128 in partial-screen mode without interaction by the user 532 with the client device 530.

The security device connection information 726 includes information communicated from the network hub 110 to the client device 530 identifying that the security device 102 is coupled to the network hub 110. The security device connection information 726 may be transmitted to the client device 530 from the network hub 110 or the security device 102, or may be requested by the client device 130 when the event message 126 is received. The client device connection information 722 defines the network to which the client device 530 is currently connected, or was most recently connected, as may be determined from the communication module 704, such as when connected to the network hub 110 or a cellular connection.

In one example, generation of the display command 518 causing automatic full-screen population may occur when the security device connection information 726 and the client device connection information 722 indicate that each of the security device 102 and the client device 530 are connected to the same network (e.g., the network 108). In another example, generation of the display command 518 causing automatic full-screen population may occur when the client device connection information 722 indicates that the client device 530 is directly connected to the security device 102. In another example, automatic full-screen population may occur when the client device connection information 722 indicates that the client device 530 is connected to one of the networks in the network list 738. In one example, generation of the display command 518 causing automatic partial-screen population may occur when the security device connection information 726 and the client device connection information 722 indicate that each of the security device 102 and the client device 530 are connected to different networks. In another example, generation of the display command 518 causing automatic partial-screen population may occur when the client device connection information 722 indicates that the client device 530 is not connected to one of the networks in the network list 738.

In one embodiment, the location information 724 includes the current, and/or most recently determined, location of the client device 530. The location information 724 may be determined using a variety of methods, including but not limited to, global navigation satellite system (GNSS) data generated by the GNSS device 706 in the client device 530, cellular tower triangulation of the client device 530, and association of the client device 530 with a location of another object (such as defining the location of the client device 530 as the same location as the network hub 110 or the security device 102 when the client device 530 is connected either to the same network 108 as the security device 102, or directly connected to the security device 102).

Generation of the display command 518 causing automatic full-screen population may occur when the location information 724 indicates that the client device 530 is located within the area boundary 736. In another example, such automatic partial-screen population may occur when the location information 724 indicates that the client device 530 is not located within the area boundary 736.

The visitor information 728 may include an expected visitors database 730 and an unexpected visitors database 732. The visitor information 728 may be generated based on data received at the client device 530 from the network-connected device 504, the security device 102, and/or the third-party database 536. In embodiments, the visitor information 728 is based on historical data of events occurring at the security device 102. For example, when the visitor 122 has been detected previously (either once or a threshold number of times) in previous event video captured by the security device 102, the visitor 122 may be identified as a known visitor and thus the facial parameters (e.g., facial image, extracted facial features, etc.) of the visitor 122 are stored in the expected visitors database 730. Conversely, when the visitor 122 has not been detected previously (either once or a threshold amount of times) in previous event video captured by the security device 102, the visitor 122 may be identified as an unknown visitor, and thus the facial parameters (e.g., facial image, extracted facial features, etc.) of the visitor 122 are stored in the unexpected visitors database 732. In various embodiments, the facial parameters (e.g., facial images and/or facial features) stored in one or both of the expected visitors database 730 and the unexpected visitors database 732 do not include a name or other identity of the visitor, and are used only within the system 500 to determine whether the visitor is, or is not, expected at the site 106.

As another example, when the visitor 122 has previously been detected, and input by the user 532 to the client device 530 indicates that the visitor 122 is known (or otherwise expected, etc.), then the facial parameters (e.g., facial image, extracted facial features, etc.) of the visitor 122 are stored in the expected visitors database 730. Conversely, when the visitor 122 has previously been detected, and input by the user 532 to the client device 530 indicates that the visitor 122 is unknown (or otherwise unexpected, etc.), then the facial parameters (e.g., facial image, extracted facial features, etc.) of the visitor 122 are stored in the unexpected visitors database 732.

As another example, facial signatures of people identified as criminals in the third-party database 536—such as those with criminal convictions (e.g., sex offenders) and/or those wanted by the police—are downloaded into the memory 708 from the third-party database 536 as unexpected visitors 732. As another example, the third-party database 536 may be a database associated with a neighborhood in which the residence 114 is located, and the expected visitors database 730 and unexpected visitors database 732 may include expected/unexpected designations by persons/visitors identified within video clips generated at security devices located at other sites within the neighborhood and published to the third-party database 536. The third-party database 536 may be an internal part of the network-connected device 504 without departing from the scope of the present embodiments.

Generation of the display command 518 causing automatic full-screen population may occur when facial information (or other identifying information) of the visitor 122 detected at the security device 102 matches an entry in the unexpected visitors 732 database. In another example, generation of the display command 518 causing automatic partial-screen population may occur when facial information (or other identifying information) of the visitor 122 detected at the security device 102 matches an entry in the expected visitors database 730.

The user-configurable flag 734 includes settings configured by the user 532 via interaction with the client device 530 (either through an application 713 operating on the client device 530, or via a remote device such as a computer, a tablet, or any other device, and then communicated to the client device 530). For example, the user-configurable flag 734 may include an override setting that automatically defines the display command 518 as a full-screen display, regardless of the client device connection information 722, the security device connection information 726, the location information 724, the visitor information 728, the area boundary 736, and/or the network list 738.

Generation of the display command 518 causing automatic full-screen population may occur when the user-configurable flag 734 indicates that all event video 128 is to be automatically populated as full-screen on the client device 530. In another example, generation of the display command 518 causing automatic partial-screen population may occur when the user-configurable flag 734 indicates that all event video 128 is to be automatically populated as partial-screen on the client device 530.

The area boundary 736 may also be user configurable. For example, the user 532 may configure the area boundary 736 via interaction with the client device 530 (either through the application 713 on the client device 530, or via a remote device such as a computer, a tablet, or any other device, and then communicated to the client device 530). For example, the area boundary 736 may indicate that, whenever the client device 530 is located in the area 540, the event video 128 is to automatically populate in full-screen display on the client device 530. The area boundary 736 need not be associated only with the site 106, or the residence 114 at which the security device 102 is located, but may be, for example, any geo-fence, such as a neighbor location, a remote location (e.g., a user's workplace) or any other geo-location.

The network list 738 may also be user configurable. For example, the user 532 may configure the network list 738 via interaction with the client device 530 (either through the application 713 on the client device 530, or via a remote device such as a computer, a tablet, or any other device, and then communicated to the client device 530). For example, the network list 738 may indicate that, whenever the client device 530 is connected to a predefined network in the network list 738, the event video 128 is to automatically populate in full-screen display on the client device 530. The predefined network may be the network 108. In embodiments, the predefined network may be a remotely located network, such as a workplace Internet connection, a Wi-Fi connection (e.g., non-cellular), or a connection to a remote device, such as a vehicle Bluetooth or cellular network.

Generation of the display command 518 causing automatic full-screen population may occur based on the event identified in the event message 126, for example when the event is triggered based on a tactile trigger, such as a press of the button 214. In another example, generation of the display command 518 causing automatic partial-screen population may occur based on the event identified in the event message 126, for example when the event is triggered during a given time of day, such as when the user 532 typically leaves the residence 114.

The display command 518 may further define a quality of video for playback on the client device 530, which may be based on full- or partial-screen resolution, and/or the bandwidth availability defined by one or both of the security device connection information 726 and the client device connection information 722.

The display command 518 may further define display parameters associated with the event message 124. For example, the display command 518 may indicate to overlay the event message 124 for a given period of time over the full-screen display of the event video 128.

The security application 713 may invoke a classifier engine to assign a classification to the event message 126 and the event video 128. As such, the security application 713 may be a convolutional neural network trained to recognize patterns within the event message 126 or the event video 128. The classification may, for example, indicate patterns of unexpected actions identified within the event video 128, such as when the visitor 122 peers through windows, vandalizes property, takes photographs, and/or steals a package in the environment 112.

The display 710 of the client device 130 may include an event message display area 714, a full-screen display area 716, and a partial-screen display area 718. The location and size of the display areas 714, 716, and 718 are not limited in scope to the illustration shown in FIG. 7, but may be relocated and resized according to any desired configuration. For example, the full-screen display area 716 may not overlay the entire display area of the display 710, but, in embodiments, may just be a larger display area than the partial-screen display area 718. When the display command 518 indicates that the event video 128 is to be played full-screen, then the video handler 712 operates to display the event video 128 in the full-screen display area 716. When the display command 518 indicates that the event video 128 is to be played partial-screen, then the video handler 712 operates to display the event video 128 in the partial-screen display area 718. When the display command 518 indicates that the event video 128 is not to be displayed, or the event notification 534 does not include the event video 128, then the event message 126 is only displayed in the event message display area 714. Moreover, the event message display area 714 may overlap the full-screen display area 716 as shown in FIG. 7. However, the event message display area 714 may, in some embodiments, not overlap either of the full-screen display area 716 or the partial-screen display area 718, and may also overlap the partial-screen display area 718 without departing from the scope of the present embodiments.

The system 500 discussed above includes the realization that certain information, such as the client device connection information 722 and the location information 724, requires heightened security to eliminate and/or reduce security vulnerabilities and data piracy. The system 500 resolves this problem by keeping sensitive information, such as the location information 724, the client device connection information 722, and the security device connection information 726, on the client device 530, while allowing the network-connected device 504 to serve as a bridge between the client device 530 and the security device 102 without receiving the sensitive information. Advantageously, this arrangement enables the system 500 to maintain increased security over sensitive information while at the same time generating the display command 518 at the client device 530, thereby allowing the user 532 to view the event video 128 immediately and without interaction at the client device 530.

Figure 8:
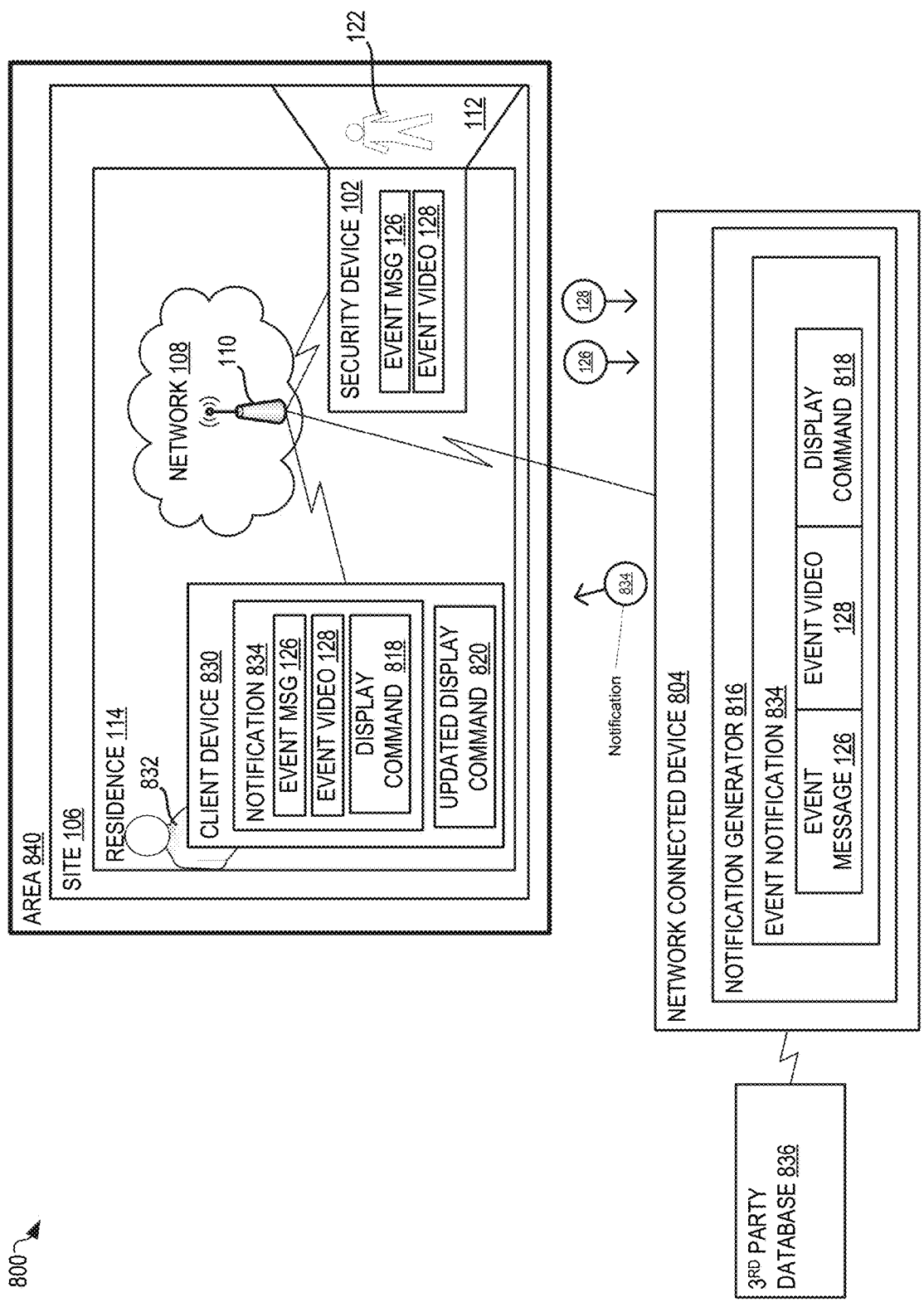
FIG. 8 is a functional block diagram illustrating another example of a system for displaying event video on a device, in another embodiment.

FIG. 8 is a functional block diagram illustrating another example of a system 800 for displaying event video on a device. The system 800 includes the security device 102 located at the residence 114 of site 106 (discussed above with respect to FIGS. 1-4). A user 832 and the client device 830 are registered with the security device 102. The security device 102 generates one or both of the event message 126 and the event video 128 upon detection of the visitor 122 in the environment 112, as discussed above with respect to FIGS. 1-4. The security device 102 is connected to the network 108 hosted by the network hub 110 (each discussed above with respect to FIGS. 1-4) to communicate one or both of the event message 126 and the event video 128 to a network-connected device 804. The system 800 controls how the event video 128 is displayed on the client device 830 based on both of the display command 818 generated at the network connected device 804, and the display command 820 generated at the client device 830.

The network-connected device 804 includes a notification generator 816. The notification generator 816 includes computer readable instructions stored in memory that, when executed by a processor, operate to generate the event notification 834 in response to receipt of the event message 126 from the security device 102. The event notification 834 may include the display command 818. The display command 818 is one or more instructions that identify how one or both of the event message 126 and the event video 128 are to be displayed on the client device 830, unless the client device 830 generates the updated display command 820 and overrides the earlier display command 818. The display command 818 is, for example, generated based on information within a third-party database 836. The network-connected device 804 sends the event notification 834 to the client device 830. The client device 830 then generates the updated display command 820. The updated display command 820 is one or more instructions that identify how one or both of the event message 126 and the event video 128 are to be displayed on the client device 830. The updated display command 820 is, for example, generated based upon one or more of an event notification 834, location information of the client device 830, connection information of the client device 830, and/or connection information of the security device 102.

In certain embodiments, the security device 102 communicates the event video 128 to the network-connected device 804 at the same time, or at a different time, as the event message 126. For example, a first communication from the security device 102 to the network-connected device 804 may include the event message 126, and may be relayed to the client device 830 as the event notification 834. Then, when the updated display command 820 generated at the client device indicates that the client device 830 is to immediately play the event video 128, the client device 830 may request the event video 128 from the security device 102 or the network-connected device 804. The security device 102 or the network-connected device 804 then sends a second event notification 834 to the client device 830 including the event video 128. These embodiments address the realization that transmission of the event video 128 between two or more of (a) the client device 830, (b) the network-connected device 804, and (c) the security device 102 uses limited and costly resources. These embodiments solve this problem by only transmitting the event video 128 when the updated display command 820 indicates that the client device 830 is to immediately display the event video 128. Advantageously, as compared to always sending the event video 128, the present embodiments reduce data transmission and resource usage associated therewith while allowing the user 832 to view the event video more quickly. Moreover, when the updated display command 820 only requires display of the event message 126, then unnecessary communication of the event video 128 is not performed.

Figure 9:
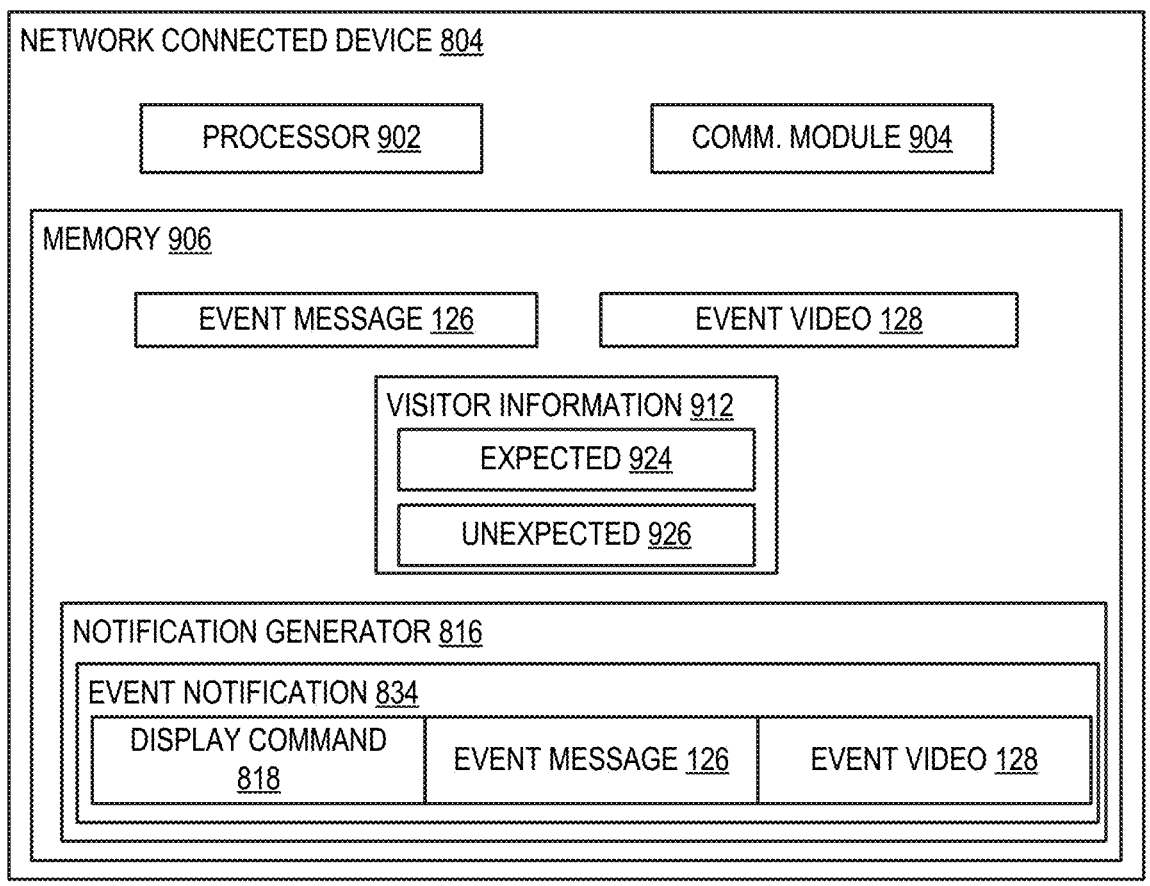
FIG. 9 is a functional block diagram illustrating one example of the network-connected device of FIG. 8 in further detail.

FIG. 9 is a functional block diagram illustrating one example of the network-connected device 804 of FIG. 8, in further detail. The network-connected device 804 may be any one or more of a cloud server, a smart home hub, a premises security hub co-located at the site 106 with the security device 102, or another similar device that is part of the network hub 110. The network-connected device 804 includes one or more of a processor 902, a communication module 904, and a memory 906. Components within the network-connected device 804 may be in electrical communication with each other via a data communication bus (not shown).

The processor 902 includes one or more processors, such as one or more microprocessors, and/or one or more supplementary co-processors, such as math co-processors. The communication module 904 may include one or more transceiver modules configured for communicating and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology. Data communicated to (e.g., the event message 126 and the event video 128) and from (e.g., the event notification 834) the network-connected device 804 is communicated and received via the communication module 904.

The memory 906 includes one or both of volatile memory, such as random access memory (RAM), as well as non-volatile memory, such as read-only memory (ROM), hard drives, flash memory, or any other suitable memory/storage element. The memory 906 may include removable memory elements, such as a CompactFlash card, a MultiMediaCard (MMC), and/or a Secure Digital (SD) card. In certain embodiments, the memory 906 includes a combination of magnetic, optical, and/or semiconductor memory, and may include, for example, RAM, ROM, a flash drive, and/or a hard disk or drive.

The event message 126 and the event video 128 received at the network-connected device 804 from the security device 102 are stored within the memory 906. The memory 906 further stores the notification generator 816 as computer readable instructions that, when executed by the processor 802, operate to generate the event notification 834, including the display command 818. The display command 818 may be configured based on visitor information 912. The event notification 834 is then communicated to the client device 830. In embodiments, instead of communicating relayed event video 128, the event notification 834 may identify connection parameters such that the security device 102 and the client device 830 connect directly together for transmission of the event video 128 as a live video stream. In embodiments, the display command 818 is generated to control the population of the event video 128 in full-screen mode on the client device 830 without the user 832 interacting with the client device 830. In embodiments, the display command 818 is automatically generated to control the client device 830 to populate the event video 128 in partial-screen mode without interaction by the user 832 with the client device 830.

Generation of the display command 818 causing automatic full-screen population may occur when facial information (or other identifying information) of the visitor 122 detected at the security device 102 matches an entry in an unexpected visitors database 926. In another example, generation of the display command 818 causing automatic partial-screen population may occur when facial information (or other identifying information) of the visitor 122 detected at the security device 102 matches an entry in an expected visitors database 924.

The visitor information 912 may include the expected visitors database 924 and the unexpected visitors database 926. The visitor information 912 may be generated based on data received at the client device 830 from one or more of the client device 830, the security device 102, the third-party database 836, and/or a back-end server containing the visitor information 912, and transmitting the visitor information 912 to the network-connected device 804. In embodiments, the visitor information 912 is based on historical data of events occurring at the security device 102. For example, when the visitor 122 has been detected previously (either once or a threshold number of times) in previous event video captured by the security device 102, the visitor 122 may be identified as a known visitor and thus the facial parameters (e.g., facial image, extracted facial features, etc.) of the visitor 122 are stored in the expected visitors database 924. Conversely, when the visitor 122 has not been detected previously (either once or a threshold amount of times) in previous event video captured by the security device 102, the visitor 122 may be identified as an unknown visitor and thus the facial parameters (e.g., facial image, extracted facial features, etc.) of the visitor 122 are stored in the unexpected visitors database 926. In various embodiments, the facial parameters (e.g., facial images and/or facial features) stored in one or both of the expected visitors database 924 and the unexpected visitors database 926 do not include a name or other identity of the visitor, and are used only within the system 800 to determine whether the visitor is, or is not, expected at the site 106.

As another example, when the visitor 122 has previously been detected, and input by the user 832 to the client device 830 indicates that the visitor 122 is known (or otherwise expected, etc.), then the facial parameters (e.g., facial image, extracted facial features, etc.) of the visitor 122 are stored in the expected visitors database 924. Conversely, when the visitor 122 has previously been detected, and input by the user 832 to the client device 830 indicates that the visitor 122 is unknown (or otherwise unexpected, etc.), then the facial parameters (e.g., facial image, extracted facial features, etc.) of the visitor 122 are stored in the unexpected visitors database 926.

As another example, facial signatures of people identified as criminals in the third-party database 836—such as those with criminal convictions (e.g., sex-offenders) and/or those wanted by the police—are downloaded into the memory 906 from the third-party database 836 into the unexpected visitors database 926. As another example, the third-party database 836 may be a database associated with a neighborhood in which the residence 114 is located, and the expected visitors database 924 and the unexpected visitors database 926 may include expected/unexpected designations by persons identified within video clips generated by security devices located at other sites within the neighborhood and published to the third-party database 836. The third-party database 836 may be an internal component to the network-connected device 804 (such that the visitor information 912 and the third party database 836 are the same) without departing from the scope of the present embodiments.

The notification generator 816 may invoke a classifier engine to assign a classification to the event message 126 and the event video 128. As such, the notification generator 816 may be a convolutional neural network trained to recognize patterns within the event message 126 or the event video 128. For example, the classification may indicate patterns of unexpected action identified within the event video 128, such as when the visitor 122 peers through windows, vandalizes property, takes photographs, and/or steals packages at the environment 112.

Figure 10:
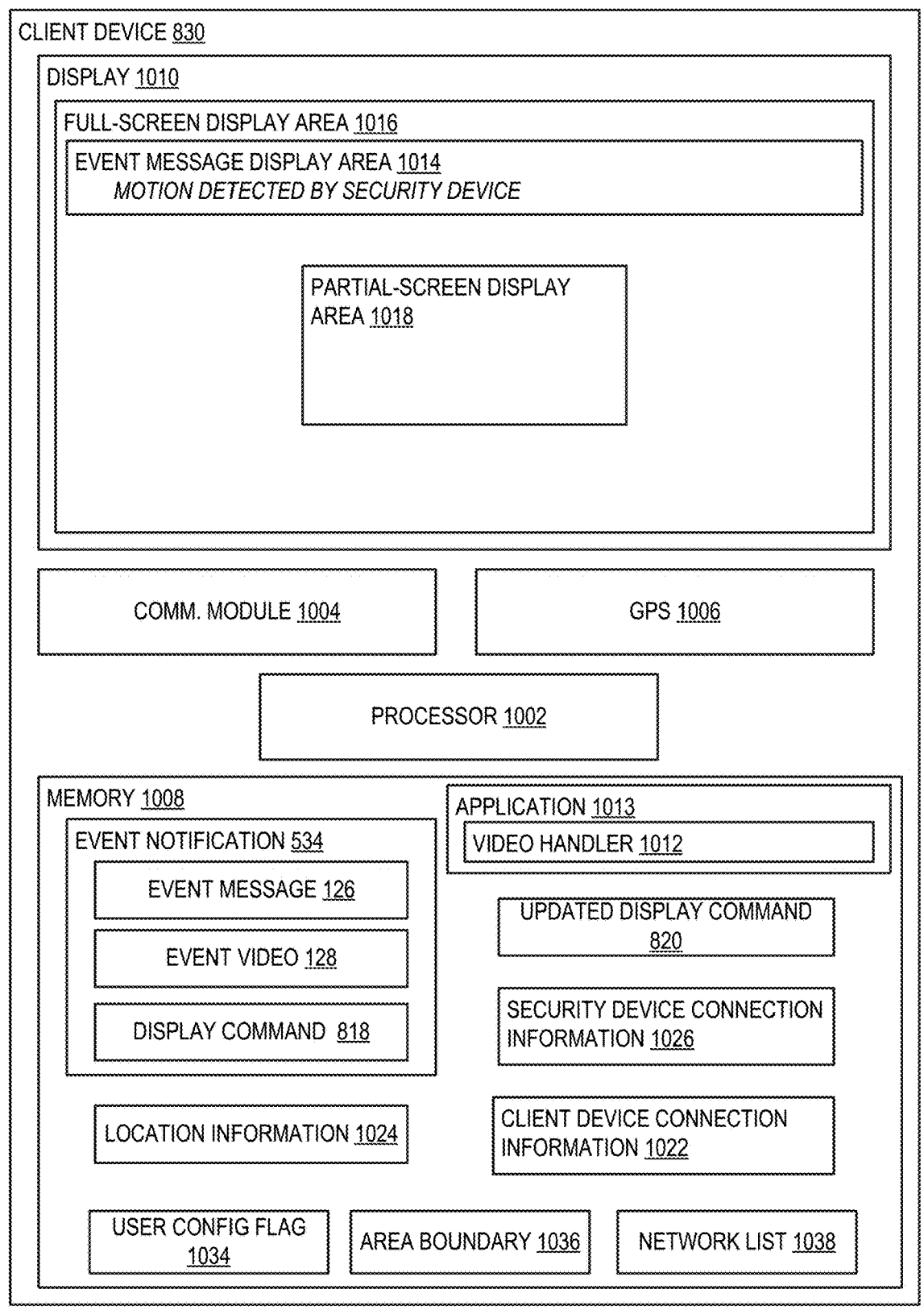
FIG. 10 is a functional block diagram illustrating one example of the client device of FIG. 8 in further detail.

FIG. 10 is a functional block diagram illustrating one example of the client device 830 of FIG. 8, in further detail. The client device 830 includes a processor 1002, a communication module 1004, a GNSS (global navigation satellite system) device 1006 (e.g., Global Positioning System (GPS), GLONASS, Galileo, BeiDou, BeiDou-2), a memory 1008, and a display 1010. The processor 1002 includes one or more processors, such as one or more microprocessors, and/or one or more supplementary co-processors, such as math co-processors.

The communication module 1004 includes one or more transceiver modules configured for communicating and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology. Data communicated to (e.g., the event notification 834) and from the client device 830 is communicated and received via the communication module 1004. Information regarding connection of the client device 830 to external devices, such as the network hub 110 and/or the security device 102, and networks, such as the network 108 to which the client device 830 is connected, are stored in the memory 1008 as client device connection information 1022. The memory 1008 may additionally store security device connection information 1026, which is received from the network hub 110 and identifies the network 108 to which the security device 102 is connected. In embodiments, the security device connection information 1026 may additionally be relayed through the network-connected device 804 such that it is also included in the event notification 834.

The GNSS device 1006 includes location identification circuitry configured to interface with a global positioning satellite to determine the location of the client device 830. The determined location is stored in the memory 1008 as the location information 1024.

The memory 1008 includes one or both of volatile memory, such as random access memory (RAM), as well as non-volatile memory, such as read-only memory (ROM), hard drives, flash memory, or other suitable memory/storage element. The memory 1008 may include removable memory elements, such as a CompactFlash card, a MultiMediaCard (MMC), and/or a Secure Digital (SD) card. In certain embodiments, the memory 1008 may include a combination of magnetic, optical, and/or semiconductor memory, and may include, for example, RAM, ROM, a flash drive, and/or a hard disk or drive.

The memory 1008 stores the event notification 834 received from the network-connected device 804 and including the event message 126, the event video 128, and the display command 818. The memory 1008 also stores a security application 1013 as computer readable instructions that, when executed by the processor 1002, generate the updated display command 820 and implement a video handler 1012 that displays one or both of the event message 126 and the event video 128 within the display 1010. The video handler 1012 may be a video player driver, or instructions for a video driver of the client device 830 that operates under control of the updated display command 820. The security device application 1013 may serve as a portal for the user 832 to access aspects of the security device 102 and the network-connected device 804, such as setting of a user-configurable flag 1034, setting or adjusting an area boundary 1036, configuring a network list 1038, configuring access to previously stored event videos, configuring settings of the security device 102, configuring other security devices registered to the user 132, and the like.

The updated display command 820 may be generated by the security application 1013 to control display of one or both of the event message 126 and the event video 128 based on one or more of the display command 818, the client device connection information 1022, the security device connection information 1026, the location information 1024, the user-configurable flag 1034, the area boundary 1036, and the network list 1038, each of which is stored in the memory 1008. The display command 818 is based on information available at the network-connected device 804, whereas the updated display command 820 may override the display command 818 where information stored at the memory 1008 has higher priority than the information relied upon in the display command 818. In certain embodiments, the display command 818 is the same as the updated display command 820, such as when the display command 818 includes settings based on visitor information 912 having higher priority than the location information 1024, the client device connection information 1022, the security device connection information 1026, the user configuration flag 1034, the area boundary 1036, and/or the network list 1038.

In embodiments, the updated display command 820 is generated to control the client device 830 to populate the event video 128 in full-screen mode without interaction between the user 832 and the client device 830. In embodiments, the updated display command 820 is automatically generated to control the client device 830 to populate the event video 128 in partial-screen mode without additional interaction between the user 832 and the client device 830.

In one example, generation of the updated display command 820 causing automatic full-screen population may occur when the security device connection information 1026 and the client device connection information 1022 indicate that each of the security device 102 and the client device 830 are connected to the same network (e.g., the network 108). In another example, generation of the updated display command 820 causing automatic full-screen population may occur when the client device connection information 1022 indicates that the client device 830 is directly connected to the security device 102. In another example, generation of the updated display command 820 causing automatic full-screen population may occur when the client device connection information 1022 indicates that the client device 830 is connected to one of the networks in the network list 1038. In one example, generation of the updated display command 820 causing automatic partial-screen population may occur when the security device connection information 1026 and the client device connection information 1022 indicate that each of the security device 102 and the client device 830 are connected to different networks. In another example, generation of the updated display command 820 causing automatic partial-screen population may occur when the client device connection information 1022 indicates that the client device 830 is not connected to one of the networks in the network list 1038.

The security device connection information 1026 includes information communicated from the network hub 110 to the client device 830 identifying that the security device 102 is coupled to the network hub 110. The client device connection information 1022 defines what network the client device 830 is currently on, and/or most recently connected to. The client device connection information 1022 may be identified based on a communication link between the communication module 1004 and an external device, such as the network hub 110 or a cellular connection.

In another example, automatic full-screen population may occur when the location information 1024 indicates that the client device 830 is located in an area matching the area boundary 1036. In another example, automatic partial-screen population may occur when the location information 1024 indicates that the client device 830 is not located in an area matching the area boundary 1036.

The location information 1024, for example, may include the current, and/or most recent, identified location of the client device 830. The location information 1024 is determined from one or more of a variety of methods, including but not limited to global navigation satellite system (GNSS) data generated by the GNSS device 1006 in the client device 830, cellular tower triangulation, and association of the client device 830 with location of another object (such as defined by the location of the client device 830 at the same location as the network hub 110 or the security device 102 when the client device 830 is connected either to the same network 108 as the security device 102, or directly connected to the security device 102).

In another example, generation of the updated display command 820 causing automatic full-screen population may occur when the user-configurable flag 1034 indicates that all event video 128 should be automatically populated as full-screen on the client device 830. In another example, generation of the updated display command 820 causing automatic partial-screen population may occur when the user-configurable flag 1034 indicates that all event video 128 should be automatically populated as partial-screen on the client device 830.

The user-configurable flag 1034 includes settings configured by the user 832 via interaction with the client device 830 (either through an application 1013 on the client device 830, or via a remote device such as a computer, a tablet, or any other device and then communicated to the client device 830). For example, the user-configurable flag 1034 may include an override setting that automatically defines the updated display command 820 as a full-screen display, regardless of the display command 818, the client device connection information 1022, the security device connection information 1026, the location information 1024, the area boundary 1036, and/or the network list 1038.

The area boundary 1036 may also be user configurable. For example, the user 832 may configure the area boundary 1036 via interaction with the client device 830 (either through the application 1013 on the client device 830, or a remote device such as a computer, a tablet, or any other device and then communicated to the client device 830). For example, the area boundary 1036 may indicate that, whenever the client device 830 is located in the area 840, the event video 128 is to automatically populate in full-screen display on the client device 830. The area boundary 1036 need not be associated only with the site 106, or the residence 114 at which the security device 102 is located, but instead may be a geo-fence such as a neighbor location, a remote location (e.g., a user's workplace) or any other geo-location.

The network list 1038 may also be user configurable. For example, the user 832 may configure the network list 1038 via interaction with the client device 830 (either through an application 1013 on the client device 830, or via a remote device such as a computer, a tablet, or any other device, and then communicated to the client device 830). For example, the network list 1038 may indicate that, whenever the client device 830 is connected to a predefined network in the network list 1038, the event video 128 is to automatically populate in full-screen display on the client device 830. The predefined network may be the network 108. In embodiments, the predefined network may be a remotely located network, such as a workplace Internet connection, a Wi-Fi connection (e.g., non-cellular), or a connection to a remote device, such as a vehicle Bluetooth or cellular network.

In another example, generation of the updated display command 820 causing automatic full-screen population may occur based on the event identified in the event message 126, for example, when the event is triggered based on a tactile trigger, such as a press of the button 214. In another example, generation of the updated display command 820 causing automatic partial-screen population may occur based on the event identified in the event message 126, for example when the event is triggered during a given time of day such as when the user 832 typically leaves the residence 114.

One or both of the display command 818 and the updated display command 820 may further define a quality of video for playback on the client device 830, which may be based on full- or partial-screen resolution, and/or the bandwidth availability defined by one or both of the security device connection information 1026 and the client device connection information 1022.

One or both of the display command 818 and the updated display command 820 may further define display parameters associated with the event message 124. For example, the display command 818 and/or the updated display command 820 may indicate to overlay the event message 124 for a given period of time over the full-screen display of the event video 128.

The display 1010 of the client device 130 may include an event message display area 1014, a full-screen display area 1016, and a partial-screen display area 1018. The location and size of the display areas 1014, 1016, and 1018 are not limited in scope to the illustration shown in FIG. 10, but may be relocated and resized according to a desired configuration. For example, the full-screen display area 1016 may not overlay the entire display area of the display 1010, but, in embodiments, may just be a larger display area than the partial-screen display area 1018. When the updated display command 820 indicates that the event video 128 is to be played full-screen, then the video handler 1012 operates to display the event video 128 in the full-screen display area 1016. When the updated display command 820 indicates that the event video 128 is to be played partial-screen, then the video handler 1012 operates to display the event video 128 in the partial-screen display area 1018. When the updated display command 820 indicates that the event video 128 is not to be displayed, or the event notification 834 does not include the event video 128, then the event message 126 is only displayed in the event message display area 1014. The event message display area 1014 may overlap the full-screen display area 1016 as shown in FIG. 10. However, the event message display area 1014 may, in some embodiments, not overlap either of the full-screen display area 1016 or the partial-screen display area 1018, and may also overlap the partial-screen display area 1018 without departing from the scope of the present embodiments.

The system 800 discussed above includes the realization that certain information, such as the client device connection information 1022 and the location information 1024, requires heightened security to eliminate and/or reduce security vulnerabilities and data piracy. The system 800 resolves this problem by keeping sensitive information on the client device 830, while allowing the network-connected device 804 to serve as a bridge between the client device 830 and the security device 102 without receiving the sensitive information. Advantageously, this arrangement allows the system 800 to maintain increased security over sensitive information while at the same time generating the display command 818 at the network-connected device 804 and the updated display command 820 at the client device 530, thereby allowing the user 832 to view the event video 128 immediately without additional interaction. Moreover, the system 800 discussed above addresses the realization that third-party databases, such as the third-party database 836, may not be coupled to a multitude of client devices, such as the client device 830 and other similar devices. The system 800 resolves this problem by allowing the third party database 836 to couple only to the network-connected device 804, and then the network-connected device 804 serves as an interface between the multiple client devices 830 and the third party database 836.

Figure 11:
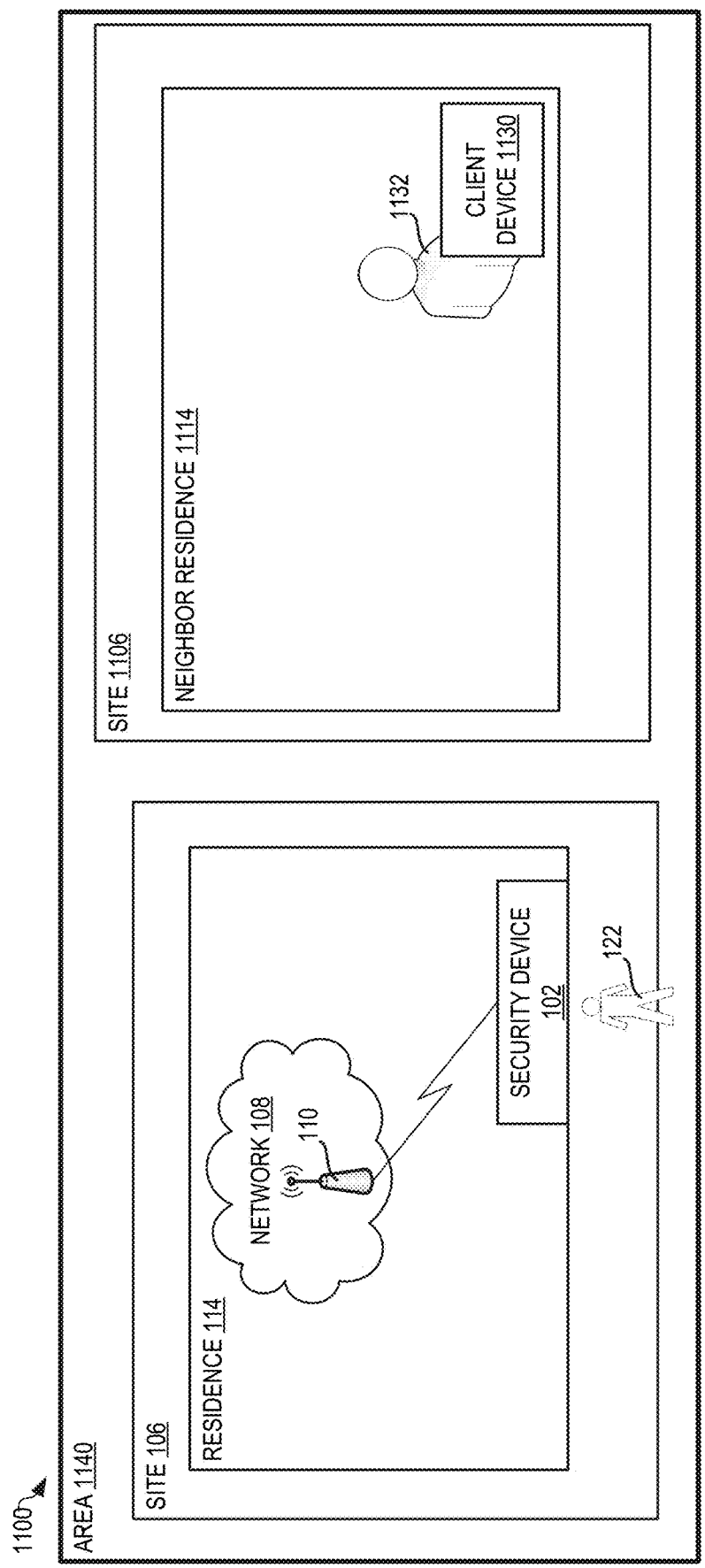
FIG. 11 is a functional block diagram illustrating one example of an area boundary, in embodiments.

FIG. 11 is a functional block diagram 1100 illustrating one example of an area boundary. The diagram 1100 illustrates that the area boundary (e.g., any of the area boundaries 316, 736, or 1036 discussed above) may encompass the site (e.g., the site 106 discussed above) where the security device 102 is located, as well as additional locations outside of the site. For example, in the diagram 1100, the area 1140 encompasses the site 106 including the residence 114 where the security device 102 is coupled to the network 108 hosted by the network hub 110. The area 1140 also encompasses a second site 1106 that includes a neighbor residence 1114.

The diagram 1100 identifies the realization that a user 1132 (which may be the same as any of the users 132, 532, and 832) may desire to have automatic full-screen, partial-screen, or no video display (e.g., event message display only) when the user 1132 is at a neighbor's house, or in another area other than the same location as the security device 102. The systems 100, 500, and 800 discussed above address this problem by allowing the user 1132 to configure his/her client device 1130 (which may be the same as any of the client devices 130, 530, and 830) with an area boundary that includes the site 1106. Advantageously, when the visitor 122 is detected by the security device 102, the desire of the user 1132 is met because the event notification is displayed according to the user's 1132 settings of the area boundary (e.g., any of area boundaries 316, 736, or 1036). The area 1140 may include additional residences other than just the adjacent neighbor residence 1114, and/or the area 1140 may be determined based on a distance from the security device 102, the network hub 110, or the residence 114, for example.

Figure 12:
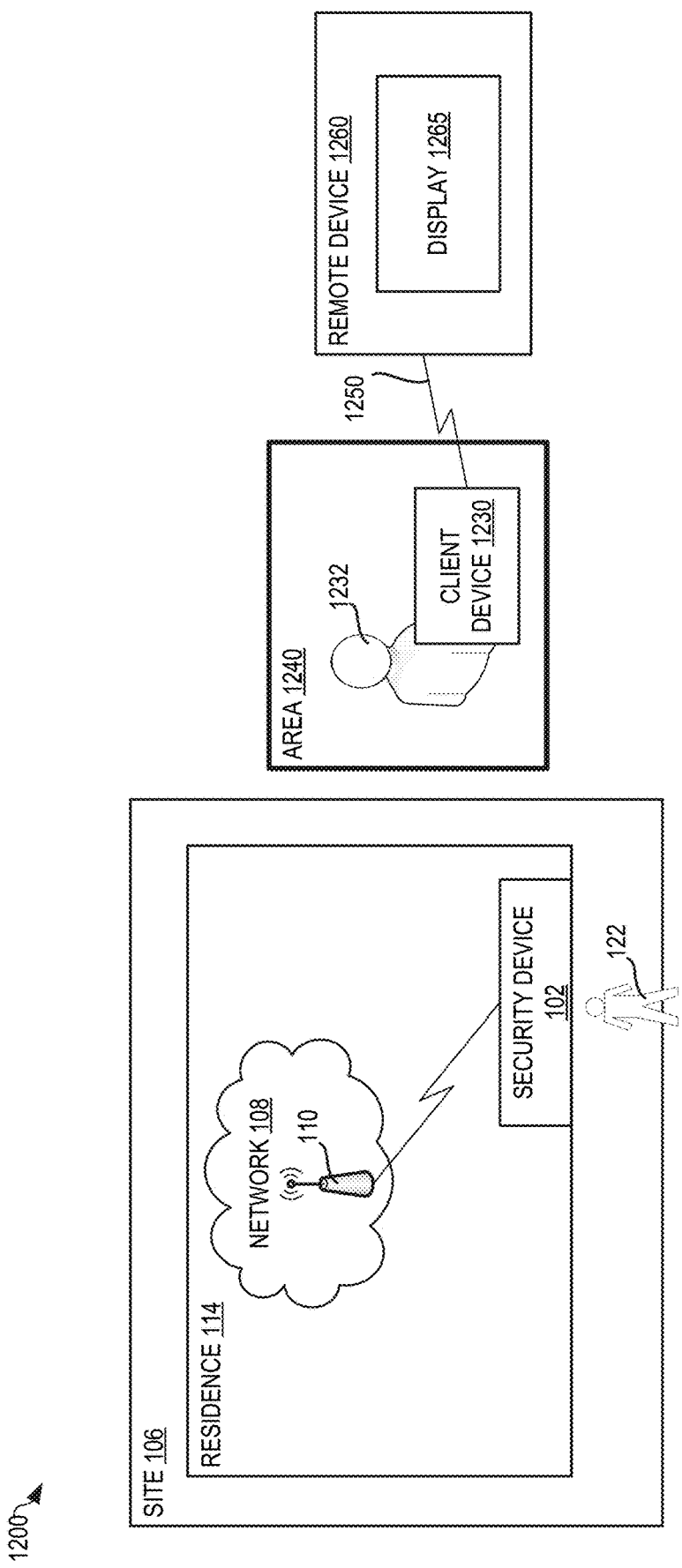
FIG. 12 is a functional block diagram illustrating another example of an area boundary and an example of a network list, in embodiments.

FIG. 12 is a functional block diagram 1200 illustrating another example of an area boundary and an example of a network list. The diagram 1200 illustrates that the area boundary (e.g., any of area boundaries 316, 736, or 1036 discussed above) may encompass a location that is entirely remote from the site (e.g., the site 106 discussed above) where the security device 102 is located. For example, in the diagram 1200, the area 1240 does not include any portion of the site 106 including the residence 114 where the security device 102 is located.

The diagram 1200 also illustrates that a network connection 1250 may not be a connection to the network 108 to which the security device is connected. For example, in the diagram 1200, the network connection 1250 is between the client device 1230 (which may be any one of the client devices 130, 530, and 830) and a remote device 1260, which is not connected to the network 108. In such a situation, the display command (e.g., the display command 118, 518, 818, or the updated display command 820 discussed above) may additionally or alternatively control the client device 1230 to communicate the event video 128 to the remote device 1260 for display on a display 1265 thereof. For example, when the remote device 1260 is a vehicle with an in-vehicle display 1265, the device settings within the client device 1230 may control the client device 1230 to communicate the event video 128 to the remote device 1260 for display on the in-vehicle display 1265. As another example, when the remote device 1260 is a remote network hub (such as a workplace Wi-Fi connection), the display command within the client device 1230 may automatically control the event video to be displayed on the client device 1230 in full-screen.

The diagram 1200 identifies the realization that the user 1232 (which may be the same as any of the users 132, 532, and 832) may desire to have automatic full-screen, partial-screen, or no video display (e.g., event message display only) when the user 1232 is in a location other than the location of the security device (such as at work or at a remote residence), or when the client device 1230 is connected to a remote device 1260. The systems 100, 500, and 800 discussed above address this problem by allowing the user 1232 to configure his/her client device 1230 (which may be the same as any of the client devices 130, 530, and 830) with an area boundary that includes the area 1240 remote from the site 106 including the security device 102, and/or a network list that does not require the client device 1230 to be connected to the network 108. Accordingly, when the visitor 122 is detected by the security device 102, the desire of the user 1232 is met because the event notification is displayed according to the user's 1232 settings of the area boundary (e.g., any of area boundaries 316, 736, or 1036) or the network list (e.g., any of the network lists 318, 738, 1038).

Figure 13:
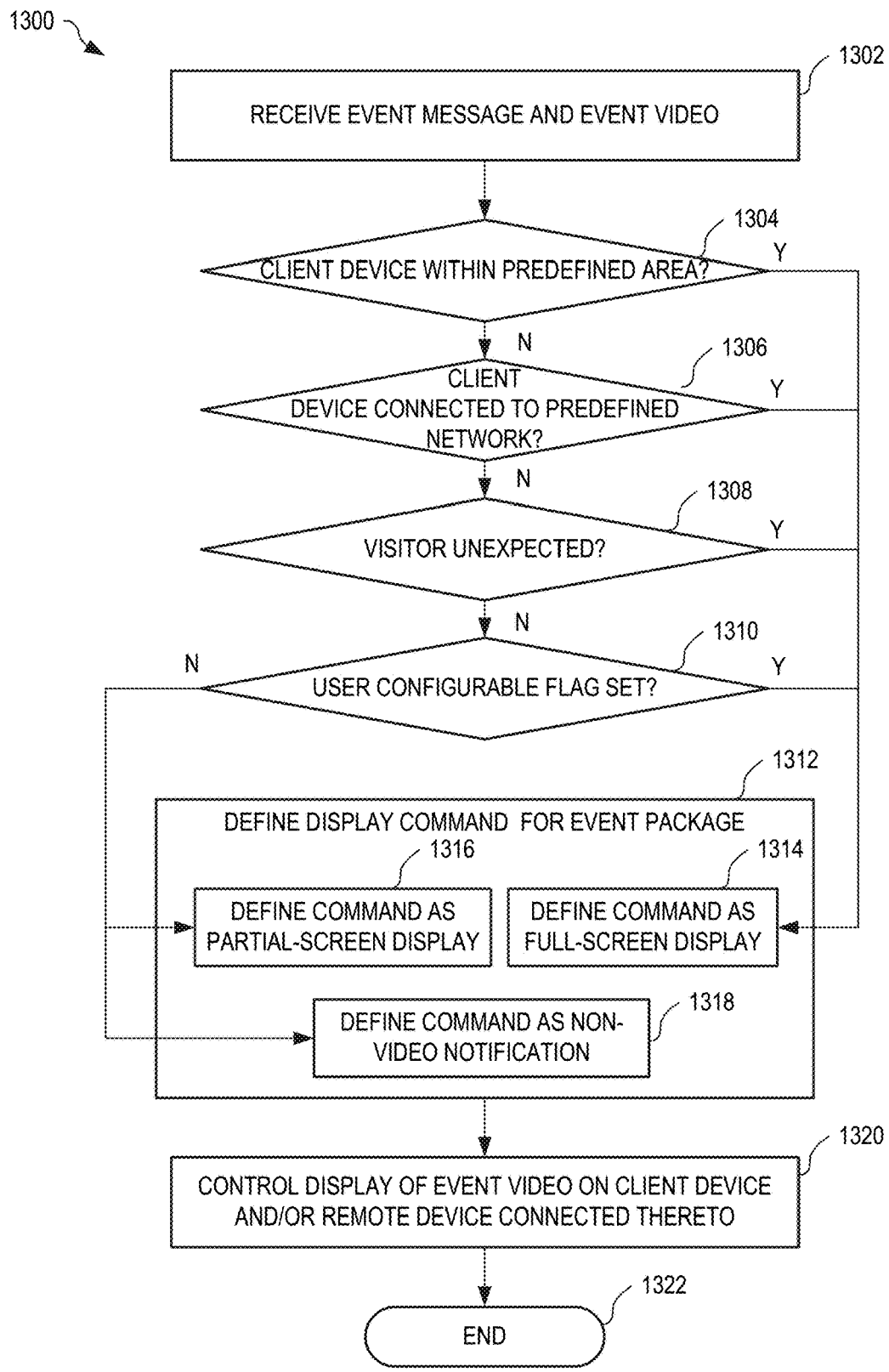
FIG. 13 is a flowchart illustrating a process for displaying event video on a device, in an embodiment.

FIG. 13 is a flowchart illustrating a process 1300 for displaying event video on a device, in an embodiment. The process 1300 may be implemented within any of systems 100, 500, and 800, discussed above, such as within one or more of the network-connected devices 104, 504, 804 and the client devices 130, 530, 830. In certain embodiments, the process 1300 is performed by one or more of the notification generators 116, 516, 816 and the video handlers 412, 712, and 1012 discussed above.

At block 1302, the process 1300 receives an event message and event video. In an example of block 1302, the network device 104 (or the network devices 504, 804) receive one or both of the event message 126 and the event video 128 discussed above. Block 1302 may be initiated in response to the event trigger type 218 causing the security device 102 to communicate the event message 126. In embodiments, block 1302 may include multiple iterations where the event message 126 is received in a first communication and the event video 128 is received after block 1312, as discussed below.

At block 1304, the process 1300 determines whether a client device is within a predefined area. In one example of block 1304, a comparison is made between the area boundary 316 and the location information 310 (or between the area boundary 736 and the location information 724, or between the area boundary 1036 and the location information 1024) to determine whether the client device is within the area boundary. When the client device is determined to be within the area boundary at block 1304, then the process advances to block 1314, which is described below. When, however, the client device is determined to be not within the area boundary at block 1304, then the process advances to block 1306.

At block 1306, the process 1300 determines whether a client device is connected to a predefined network. In one example of block 1306, a comparison is made between the network list 318 and one or both of the security device connection information 320 and the client device connection information 322 (or between the network list 738 and the client device connection information 722 and the security device connection information 726, or between the network list 1038 and the client device connection information 1022 and the security device connection information 1026) to determine whether there is a match. When there is a match, then the client device 130 is determined to be connected to the predefined network. A match in block 1306 may occur based on the settings of the network lists 318, 738, 1038, the security device connection information 320, 726, 1026, and the client device connection information 322, 722, 1022, as discussed above with reference to FIGS. 1-12. When there is a match in block 1306, then the process advances to block 1314, which is described below. When, however, there is no match in block 1306, then the process advances to block 1308.

At block 1308, the process 1300 determines whether the event that initiated transmission of the event message received in block 1302 includes an unexpected visitor. In one example of block 1306, a comparison is made between the visitor 122 identified in the event video 128 against the visitor information 312 (or the visitor information 728, 912). When there is a match between the visitor 122 and the unexpected visitors database 326 (or the unexpected visitors database 732, 926), then the visitor 122 is determined to be unexpected. When there is no match between the visitor 122 and the unexpected visitors database 326 (or the unexpected visitors database 732, 926), and there is no match between the visitor 122 and the expected visitors database 324 (or the expected visitors database 730, 924), then the visitor 122 is determined to be unexpected because the visitor 122 is unknown. When there is a match between the visitor 122 and the expected visitors database 324 (or the expected visitors database 730, 924), the visitor is determined to be expected. When the visitor 122 is determined to be unexpected in block 1308, then the process advances to block 1314, which is described below. When, however, the visitor 122 is determined to be expected in block 1308, then the process advances to block 1310.

At block 1310, the process 1300 determines whether a user-configurable flag has been set such that the user desires full-screen population of the event video within the event message received at block 1302. In one example of block 1310, the notification generator 116 determines whether the user 132 has set the user-configurable flag 314 to cause automatic full-screen display of event video 128. In another example of block 1310, the video handler 712 determines whether the user 532 has set the user-configurable flag 734 to cause automatic full-screen display of event video 128. In another example of block 1310, the video handler 1012 determines whether the user 832 has set the user-configurable flag 1034 to cause automatic full-screen display of event video 128. When the process 1300 determines the user-configurable flag has been set such that the user desires full-screen population of the event video within the event message in block 1310, then the process advances to block 1314. When, however, the process 1300 determines the user-configurable flag has not been set such that the user desires full-screen population of the event video within the event message in block 1310, then the process advances to block 1316.

At block 1312, the process 1300 defines the display command associated with the event message received at block 1302. Block 1312 may be dependent on one or more of the determinations from blocks 1304, 1306, 1308, and 1310. For example, when the answer is yes (e.g., there is a match) in any of blocks 1304, 1306, 1308, and 1310, then block 1312 may operate according to sub-block 1314 such that the process defines the display command (e.g., the display command 118, 518, 818, or the updated display command 820) as full-screen display. As another example, when the answer is no (e.g., there is not a match) in all of blocks 1304, 1306, 1308, and 1310, then block 1312 may operate according to sub-block 1316 such that the process defines the display command (e.g., the display command 118, 518, 818, or the updated display command 820) as partial-screen display. As another example, when at block 1310, the process 1300 determines that the user has blocked all display of the event video 128, then the block 1312 may operate according to sub-block 1318 such that only the event message 126 is displayed.

At block 1320, the process 1300 controls display of the event video and/or the event message on the client device and/or a remote device connected thereto. In one example of block 1320, the display command 118 is communicated to the client device 130 such that the event message 126 is displayed in the event message display area 414, and the event video 128 is displayed in either the full-screen display area 416 or the partial-screen display area 418. In another example of block 1320, the display command 518 controls the client device 530 such that the event message 126 is displayed in the event message display area 714, and the event video 128 is displayed in either the full-screen display area 716 or the partial-screen display area 718. In another example of block 1320, the display command 818 is communicated to the client device 830 and optionally updated to the updated display command 820 to control the client device 830 such that the event message 126 is displayed in the event message display area 1014, and the event video 128 is displayed in either the full-screen display area 1016 or the partial-screen display area 1018. In another example of block 1320, the display command 118, 518, 818 or the updated display command 820 indicates that the client device 1230 should communicate with the remote device 1260 such that the event video 128 and/or event message 126 is displayed on display 1265. At block 1322, the process 1300 ends.

Figure 14:
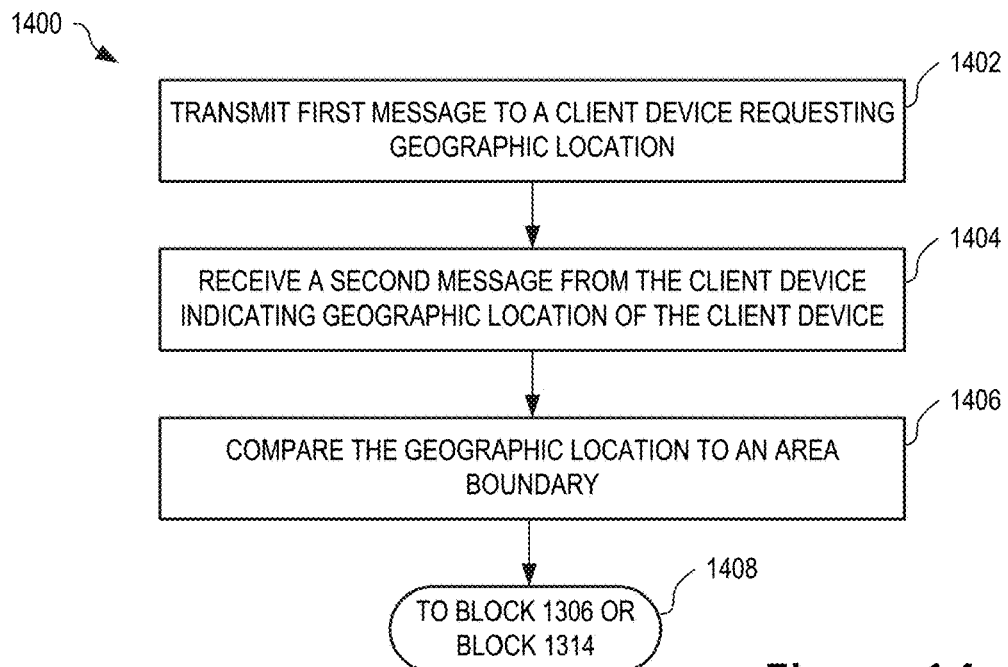
FIG. 14 is a flowchart illustrating a process that determines whether a client device is in a predefined area, in an embodiment.

FIG. 14 is a flowchart illustrating a process 1400 for determining whether a client device is in a predefined area, in an embodiment. The process 1400 is an example of block 1304 of the process 1300 of FIG. 13. Thus, in some embodiments, the process 1400 may commence after block 1302 of the process 1300 completes.

At block 1402 a first message is transmitted to a client device requesting a current geographic location of the client device. In one example of block 1402, the network-connected device 104 transmits a first message to the client device 130 requesting the location information 310. Block 1402 may be performed in response to receipt of the event message 126 to obtain the current geographic location of the client device (e.g., the client device 130), or may be performed periodically, or randomly, such that a most recent geographic location of the client device (e.g., the client device 130) is maintained at the network-connected device (e.g., the network-connected device 104).

At block 1404 a second message is received from a client device including the geographic location of the client device. In one example of block 1404, the network-connected device 104 receives a second message from the client device 130 including the location information 310. In embodiments, block 1404 is performed without block 1402, such that the client device 130 periodically, or randomly, transmits its location information 310 to the network-connected device 104.

At block 1406, a geographic location of the client device is compared to an area boundary. In one example of block 1406, the location information 310 received at block 1404 is compared to the area boundary 316 to determine whether there is a match therebetween. In another example of block 1406, the location information 724 is compared to the area boundary 736 to determine whether there is a match therebetween. In another example of block 1406, the location information 1024 is compared to the area boundary 1036 to determine whether there is a match therebetween. At block 1408, the process 1400 ends, and the process 1300 continues with either block 1306 or block 1314, depending upon the result of the comparison in block 1406.

Figure 15:
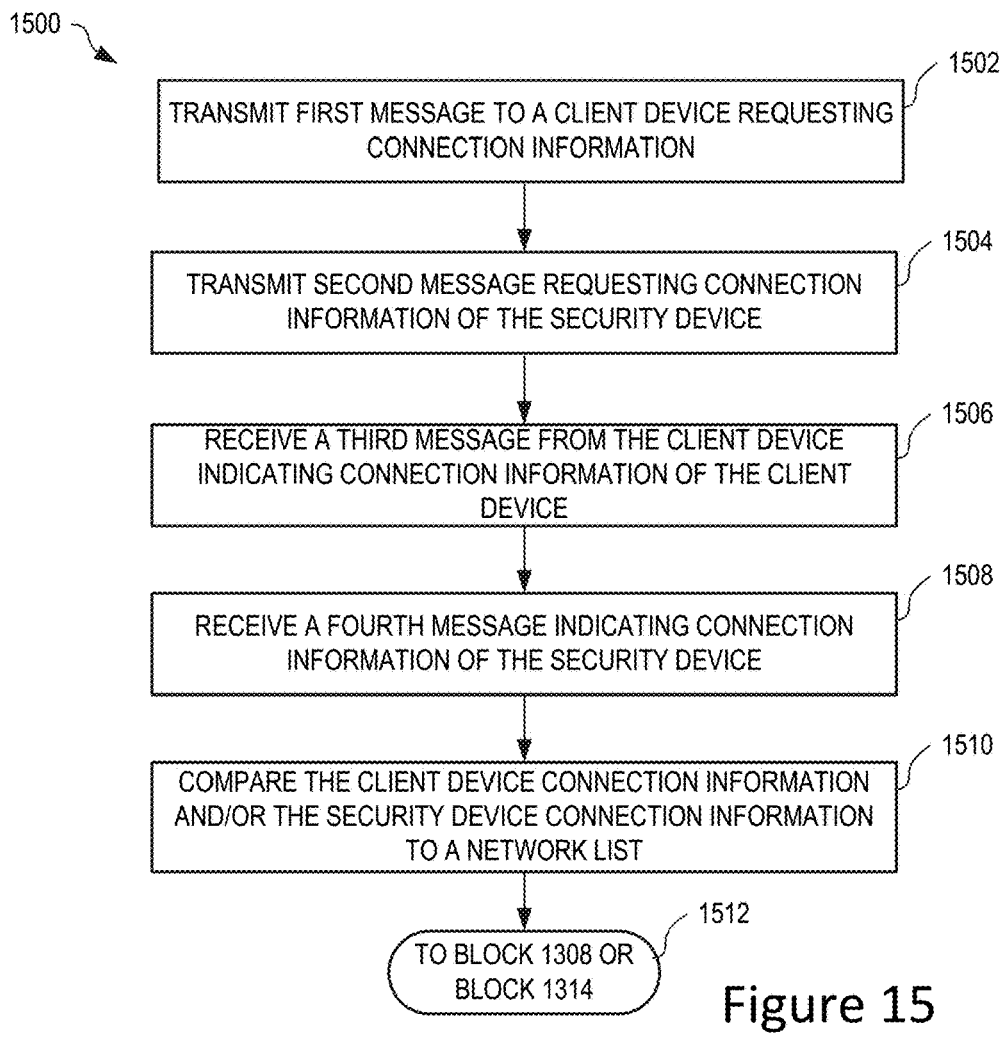
FIG. 15 is a flowchart illustrating a process that determines whether a client device is connected to a predefined network, in an embodiment.

FIG. 15 is a flowchart illustrating a process 1500 for determining whether a client device is connected to a predefined network, in an embodiment. The process 1500 is an example of block 1306 of the process 1300. Thus, in some embodiments, the process 1500 may commence after the process 1300 determines at block 1304 that the client device is not in the predefined area.

At block 1502 a first message is transmitted to a client device requesting current connection information of the client device. In one example of block 1502, the network-connected device 104 transmits a first message to the client device 130 requesting the client device connection information 322. Block 1502 may be performed in response to receipt of the event message 126 to obtain the current connection information of the client device (e.g., the client device 130), or may be performed periodically, or randomly, such that the most recent connection information of the client device (e.g., the client device 130) is maintained at the network-connected device (e.g., the network-connected device 104).

At block 1504 a second message is transmitted requesting current connection information of the security device. In one example of block 1504, the network-connected device 104 transmits a second message to the security device 102 and/or the network hub 110 requesting the security device connection information 320. In another example of block 1504, the client device 530 transmits a second message to the security device 102 and/or the network hub 110 requesting the security device connection information 726. In another example of block 1504, the client device 830 transmits a second message to the security device 102 and/or the network hub 110 requesting the security device connection information 1026. Block 1504 may be performed in response to receipt of the event message 126 to obtain the current connection information of the security device (e.g., the security device 102), or may be performed periodically, or randomly, such that a most-recent connection information of the security device (e.g., the security device 102) is maintained at the network-connected device (e.g., the network-connected device 104) or the client device 530, 830.

At block 1506 a third message is received from a client device including current connection information of the client device. In one example of block 1506, the network-connected device 104 receives a third message from the client device 130 including the client device connection information 722. In embodiments, block 1506 is performed without blocks 1502, 1504, such that the client device 130 periodically, or randomly, transmits its client device connection information 322 to the network-connected device 104.

At block 1508 a fourth message is received including connection information of the security device. In one example of block 1504, the network-connected device 104 receives a fourth message from the security device 102 and/or the network hub 110 including the security device connection information 320. In another example of block 1508, the client device 530 receives a fourth message from the security device 102 and/or the network hub 110 including the security device connection information 726. In another example of block 1504, the client device 830 receives a fourth message from the security device 102 and/or the network hub 110 including the security device connection information 1026. In embodiments, block 1508 is performed without blocks 1502, 1504, 1506 such that the security device 102 and/or the network hub 110 periodically, or randomly, transmits the security device connection information 320, 726, or 1026 to the network-connected device 104 or the client device 530 or 830.

At block 1510, the client device connection information and/or the security device connection information is compared to a network list. In one example of block 1510, the client device connection information 322 received at block 1506 is compared to the network list 318 to determine whether there is a match therebetween, such as when the client device 130 is connected to a predefined network in the network list 318. In another example of block 1510, the client device connection information 322 received at block 1506 and the security device connection information 320 received at block 1506 are compared to the network list 318 to determine whether there is a match therebetween, such as when the client device 130 is connected to the same network (e.g., the network 108) as the security device 102, or when the client device 130 is directly connected to the security device 102. In another example of block 1510, the client device connection information 722 received at block 1506 is compared to the network list 738 to determine whether there is a match therebetween, such as when the client device 530 is connected to a predefined network in the network list 738. In another example of block 1510, the client device connection information 722 received at block 1506 and the security device connection information 726 received at block 1506 are compared to the network list 738 to determine whether there is a match therebetween, such as when the client device 530 is connected to the same network (e.g., the network 108) as the security device 102, or when the client device 530 is directly connected to the security device 102. In another example of block 1510, the client device connection information 1022 received at block 1506 is compared to the network list 1038 to determine whether there is a match therebetween, such as when the client device 830 is connected to a predefined network in the network list 1038. In another example of block 1510, the client device connection information 1022 received at block 1506 and the security device connection information 1026 received at block 1506 are compared to the network list 1038 to determine whether there is a match therebetween, such as when the client device 830 is connected to the same network (e.g., the network 108) as the security device 102, or when the client device 830 is directly connected to the security device 102. At block 1512, the process 1500 ends, and the process 1300 continues with either block 1308 or block 1314, depending upon the result of the comparison in block 1510.

A/V Recording and Communication Device and Hub Device

Figure 16:
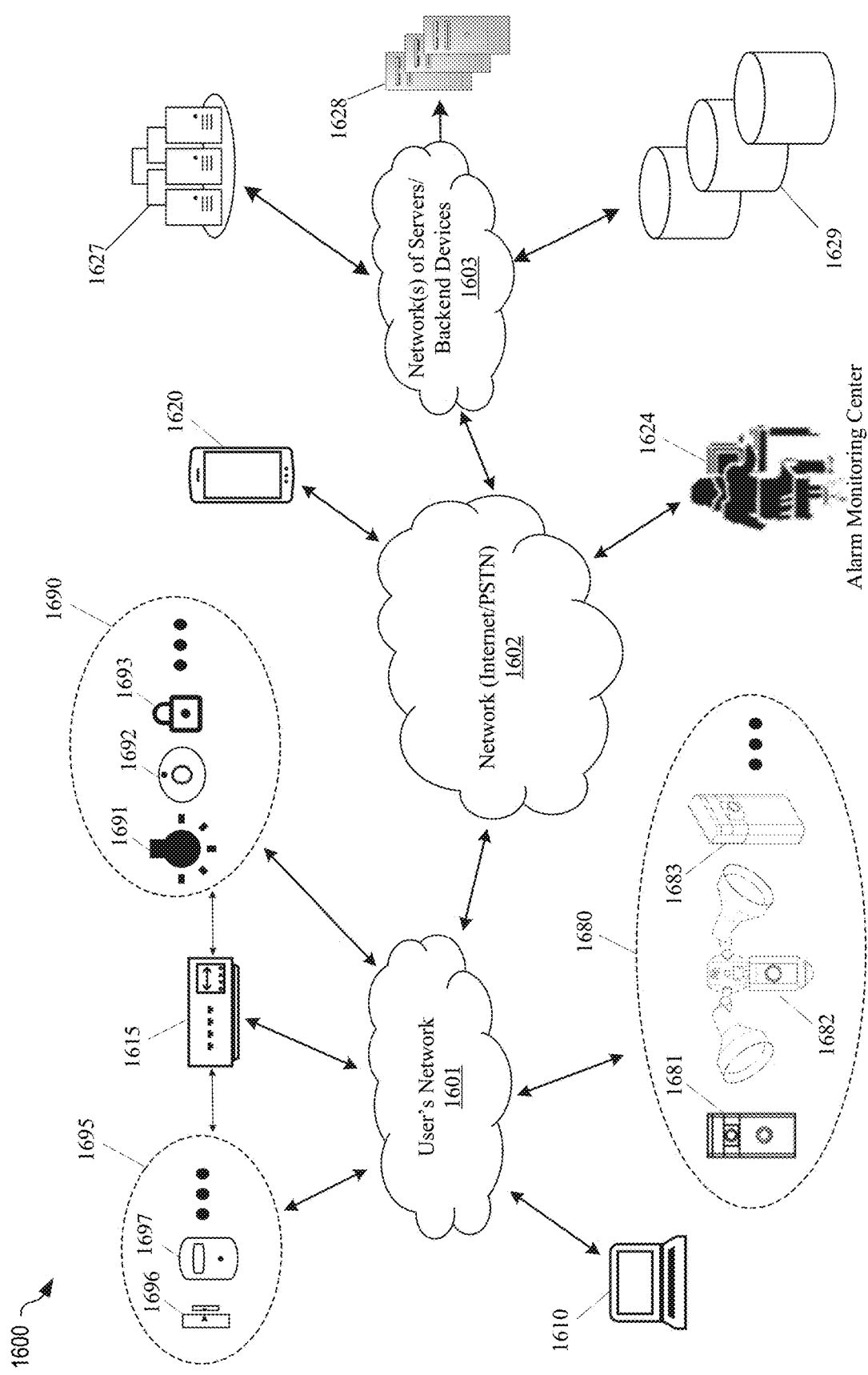
FIG. 16 is a functional block diagram illustrating a system including a hub device with which certain embodiments may be implemented, according to an embodiment.

FIG. 16 is a functional block diagram illustrating a system including a hub device with which certain embodiments may be implemented, according to various aspects of present disclosure. A system 1600 for communication between several user devices is connected to a user's network (e.g., a home network) 1601, and remote servers and other remote devices connected to other networks 1602, 1603. Specifically, the user's network 1601, in some of the present embodiments, may include a hub device 1615, security/alarm devices 1695 and smart home devices 1690 associated with the hub device 1615, client device(s) 1610, and audio/video (A/V) recording and communication devices 1680. An alarm monitoring center 1624 and a client device 1620, among other entities and devices, may be connected to the public network 1602. Additionally, the backend network 1603 may include several backend devices, such as one or more remote storage devices 1629, one or more servers 1628, and one or more backend application programming interfaces (APIs) 1627.

The user's network 1601 may be, for example, a wired and/or wireless network (e.g., Ethernet network, Wi-Fi network, ZigBee network, Z-Wave network, etc.). Alternatively, or in addition, the user's network 1601 may comprise various networks such as a cellular/mobile network, a local network, a public network, a low-bandwidth network, and/or any other appropriate network. When the user's network 1601 is wireless, or includes a wireless component, the network 1601 may be a Wi-Fi network compatible with the IEEE 802.11 standard and/or other wireless communication standard(s).

As shown in FIG. 16, the user's network 1601 is connected to another network 1602, which may comprise, for example, the Internet and/or a public switched telephone network (PSTN). As described below, the security devices 1695, the smart home devices 1690, and the A/V recording and communication devices 1680 may communicate with the client devices 1610, 1620 via the network 1601 and the network 1602 (Internet/PSTN). In various embodiments, any or all of the hub device 1615, the security devices 1695, the smart home devices 1690, and the A/V recording and communication devices 1680 may communicate with the client devices 1610, 1620 directly (e.g., using one or more wireless technologies and/or protocols, such as Bluetooth, Bluetooth LE, ZigBee, Z-Wave, etc.). The network 1602 may be any wireless network or any wired network, or a combination thereof, configured to operatively couple the above-mentioned modules, devices, and systems as shown in FIG. 16. For example, the network 1602 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

With further reference to FIG. 16, the hub device 1615, in some of the present embodiments, may comprise any device that facilitates communication with and control of the alarm devices 1695 and the smart devices 1690. In some aspects of the present embodiments, the hub device 1615 may also facilitate communication with and control of the A/V recording and communication devices 1680. The hub device 1615 may be powered by a connection to an external power (e.g., AC mains). Additionally, the hub device 1615 may include an internal backup battery to which the hub device 1615 switches when the external power is disconnected.

The security devices 1695 and the smart devices 1690, in some of the present embodiments, may communicate with the hub device 1615 directly (e.g., using one or more wireless technologies and/or protocols, such as Bluetooth, Bluetooth LE, ZigBee, Z-Wave, etc.) and/or indirectly (e.g., via the user's network 1601). In some of the present embodiments, the A/V recording and communication devices 1680 may communicate with the hub device 1615 through one or more networks (e.g., the user's network 1601 and the network 1602). Although not shown in FIG. 16, in some embodiments, the hub device 1615 may communicate directly with the A/V recording and communication devices 1680 (e.g., via wired and/or wireless channels). The hub device 1615 may include any or all of the components and/or functionality of the network-connected device 104 described in detail above with reference to FIG. 3.

With continued reference to FIG. 16, the alarm devices 1695 may include, but are not limited to, monitoring sensors, such as contact sensors 1696 (e.g., door sensors, window sensors, etc.), motion sensors 1697, noise detectors (not shown), glass-break sensors (not shown), and/or other similar intrusion detection sensors. These sensors (or detectors) may be used for monitoring and/or detecting unauthorized entry into a property. As will be described in more detail below, when any of the sensors 1695 are tripped (or triggered), the sensor may immediately transmit an intrusion event signal to the hub device 1615 via a communication path (e.g., a wireless and/or wired channel).

The smart devices 1690 may include, but are not limited to, indoor/outdoor lighting systems (e.g., smart light emitting diodes (LEDs) 1691), temperature control systems (e.g., thermostats 1692), locking control systems for doors and/or windows (e.g., smart locks 1693), shade/blind control systems (not shown), or any other automation (or smart home) devices that can communicate with, and be controlled by, the hub device 1615.

In some of the present embodiments, the hub device 1615 may be a component of a home automation system installed at a property of a user who is associated with the client devices 1610, 1620. Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. The smart home devices 1690 and the alarm devices 1695, when remotely monitored and controlled via the network (Internet/PSTN) 1602, may be considered to be components of the Internet of Things. The home automation system may use one or more communication technologies and/or protocols, including either or both of wired and wireless protocols, including but not limited to Wi-Fi, X10, Ethernet, RS-485, 6LoWPAN, BTLE, ZigBee, and Z-Wave.

The smart home devices 1690 and the alarm devices 1695 may be controlled via a user interface in some of the present embodiments. The user interface may include any or all of a wall-mounted terminal, software installed on the client devices 1610, 1620 (e.g., a mobile application), a tablet computer or a web interface, and may communicate with Internet cloud services. In addition to communicating with, and/or controlling, the smart home devices 1690 and the alarm devices 1695, in various embodiments, the client devices 1610, 1620 may also be configured to be in network communication with, and/or controlling, the A/V recording and communication devices 1680 (e.g., via the networks 1601 and 1602). The client devices 1610, 1620 may comprise, for example, a mobile phone such as a smartphone, or a computing device such as a tablet computer, a laptop computer, a desktop computer, etc. The client devices 1610, 1620 may include any or all of the components and/or functionality of the client device 1630 described above with reference to FIG. 4.

With further reference to FIG. 16, the system 1600 may also include one or more A/V recording and communication devices 1680 (e.g., installed at the same property where the alarm devices 1695 and smart home devices 1690 are installed). The A/V recording and communication devices 1680 may include, but are not limited to, video doorbells 1681, lighting systems with A/V recording and communication capabilities (e.g., floodlight cameras 1682, spotlight cameras (not shown), etc.), security cameras 1683, or any other similar devices. In some embodiments, the user may control the A/V recording and communication devices 1680 using either or both of the client devices 1610, 1620. Additionally, in some embodiments, the user may control the A/V recording and communication devices 1680 through the hub device 1615 (e.g., using either or both of the client devices 1610, 1620). In some embodiments, however, the client devices 1610, 1620 may not be associated with an A/V recording and communication device.

As described above, a user may control the smart home devices 1690, the alarm devices 1695, and/or the A/V recording and communication devices 1680, using one or more applications executing on a client device of the user (e.g., the client device 1620). For example, the user may turn on/off the lights 1691, may turn up/down the temperature using the thermostat 1692, may lock/unlock the doors and windows through the locks 1692, etc. The user may also arm/disarm one or more of the security/alarm devices 1695 (and one or more of the A/V recording and communication devices 1680) using the client devices 1610, 1620.

With further reference to FIG. 16, the system 1600 may also include one or more remote storage devices 1629 (may be referred to interchangeably as "cloud storage device(s)"), one or more servers 1628, and one or more backend application programming interfaces (APIs) 1627 that are connected to network 1603. The network 1603 may be similar in structure and/or function to the above-described user's network 1601. The hub 1615 (and in some embodiments the hub's associated security devices 1695 and smart devices 1690) and/or the A/V recording and communication devices 1680 may communicate with, and be managed by, the remote servers 1628 and APIs 1627 through the networks 1601, 1602, and 1603. Examples of such communications are described below.

While FIG. 16 illustrates the storage devices 1629, the servers 1628, and the backend APIs 1627 as components of the network 1603 and separate from the network 1602, in some aspects of the present embodiments, one or more of the storage devices 1629, the servers 1628, and the backend APIs 1627 may be components of the network 102. Additionally, in some embodiments, the storage devices 1629 may be separate from the backend servers 1628 or may be an integral component of the backend servers 1628. Any of the backend APIs 1627 may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the backend API may hold the bulk of the user data and offer the user management capabilities, leaving the clients to have very limited state.

Each of the backend APIs 1627 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming graphical user interface (GUI) components. For example, an API may facilitate integration of new features into existing applications (a so-called "plug-in API"). An API may also assist otherwise distinct applications with sharing data, which can help to integrate and enhance the functionalities of the applications.

Each of the backend APIs 1627 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both run on the same machine. Clients and servers may have a user interface, and sometimes other hardware associated with them.

With continued reference to FIG. 16, the system 1600 may also include the security/alarm monitoring center 1624. In some embodiments, each time the hub 1615 receives an intrusion alert signal from one or more of the security/alarm devices 1695 (e.g., when one or more of the sensors 1696 and/or 1697 are triggered), the hub 1615 may send a security breach signal to the security/alarm monitoring center 1624. In addition to the hub 1615, the A/V recording and communication devices 1680 of some embodiments may also send a security breach signal to the security/alarm monitoring center 1624 when these devices determine that an emergency situation has occurred. For example, when one of the A/V recording and communication devices 1680 (e.g., the floodlight camera 1682) detects an unexpected person and/or activity in an area about the location of the A/V recording and communication device, the device may send a security breach signal to the alarm monitoring center 1624.

The security/alarm monitoring center 1624 (e.g., an operator of the center) may, in turn, dispatch civil authorities to investigate the monitored premises and/or may send other types of notifications, including, but not limited to, text messages, such as SMS (Short Message Service) messages, MMS (Multimedia Messaging Service) messages, email messages, voice messages (either live or recorded), etc. to one or more client devices of a user, such as the client devices 1610, 1620. Typically, when the security/alarm monitoring center 1624 does not receive an acknowledgment from the user, or receive an acknowledgment in which the user informs the center of an emergency situation (e.g., the user is away from home), the monitoring center may contact an emergency call center (not shown in the communication system 1600). The emergency call center may comprise a local 911 call center that serves a region in which the hub 1615 is located. The emergency call center may also be reached by the client devices 1610, 1620, and/or the backend devices 1627, 1628 directly (e.g., using a PSTN) or indirectly (e.g., through the networks 1601, 1602, and 1603).

In some alternative embodiments, the security monitoring center 1624 may not be a separate entity different from the backend servers 1628 (and/or the backend APIs 1627). For example, in some of the present embodiments, the backend servers 1628 may monitor the home security devices 1695 and/or the hub 1615 (and other security systems not shown in the figures) in addition to managing the hub 1615 and/or the A/V recording and communication devices 1680.

Figure 17:
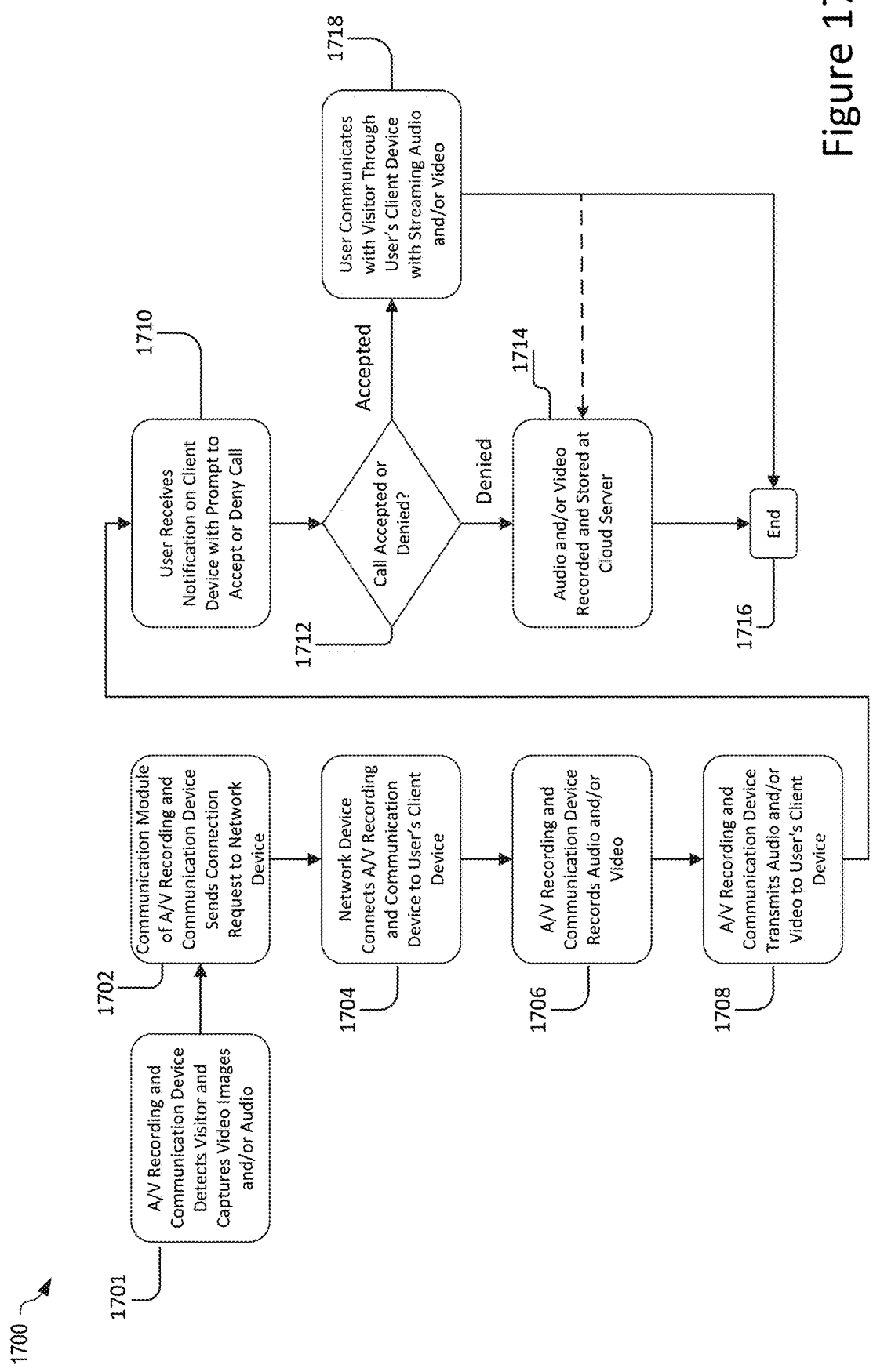
FIG. 17 is a flowchart illustrating a process for streaming and storing audio/video (A/V) event video from the A/V device of FIG. 16, according to an embodiment.

FIG. 17 is a flowchart illustrating a process 1700 for streaming and storing A/V event video from the A/V recording and communication device 1680, in an embodiment. Process 1700 may illustrate, for example, transmission of the event video 128 to the client device 130, 530, 830, or 1620 in embodiments. At block 1701, the A/V recording and communication device 1680 detects the visitor's presence and captures video images within a field of view of a camera of the A/V recording and communication device 1680. The A/V recording and communication device 1680 may also capture audio through a microphone of the A/V recording and communication device 1680. As described above, the A/V recording and communication device 1680 may detect the visitor's presence by detecting motion using the camera and/or a motion sensor, and/or by detecting that the visitor has pressed a front button of the A/V recording and communication device 1680 (for example, when the A/V recording and communication device 1680 is a doorbell). Also as described above, the video recording/capture may begin when the visitor is detected, or may begin earlier, as described below.

At block 1702, a communication module of the A/V recording and communication device 1680 sends a connection request, via the user's network 1601 and the network 1602, to a device in the network 1602. For example, the network device to which the connection request is sent may be a server such as the server 1681. The server 1681 may include a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 1627, which is described above.

In response to the request, at block 1704 the network device may connect the A/V recording and communication device 1680 to the user's client device 1620 through the user's network 1601 and the network 1602. At block 1706, the A/V recording and communication device 1680 may record available audio and/or video data using a camera, a microphone, and/or any other device/sensor available. At block 1708, the audio and/or video data is communicated (streamed) from the A/V recording and communication device 1680 to the user's client device 1620 via the user's network 1601 and the network 1602. At block 1710, the user may receive a notification on the user's client device 1614 with a prompt to either accept or deny the call. In embodiments, block 1710 may be ignored, particularly where the display command 118, 518, 818, or 820 causes automatic display of the video on the client device.

At block 1712, the process 1700 determines whether the user has accepted or denied the call. When the user denies the notification, then the process 1700 advances to block 1714, where the audio and/or video data is recorded and stored at a cloud server. The session then ends at block 1716 and the connection between the A/V recording and communication device 1680 and the user's client device 1620 is terminated. When, however, the user accepts the notification, the process 1700 proceeds with block 1718 where the user communicates with the visitor through the user's client device 1620 while audio and/or video data captured by the camera, the microphone, and/or other devices/sensors, is streamed to the user's client device 1620. At the end of the call, the user may terminate the connection between the user's client device 1620 and the A/V recording and communication device 1680 and the session ends at block 1716. In some embodiments, the audio and/or video data may be recorded and stored at a cloud server (block 1714) even when the user accepts the notification and communicates with the visitor through the user's client device 1620.

Figure 18:
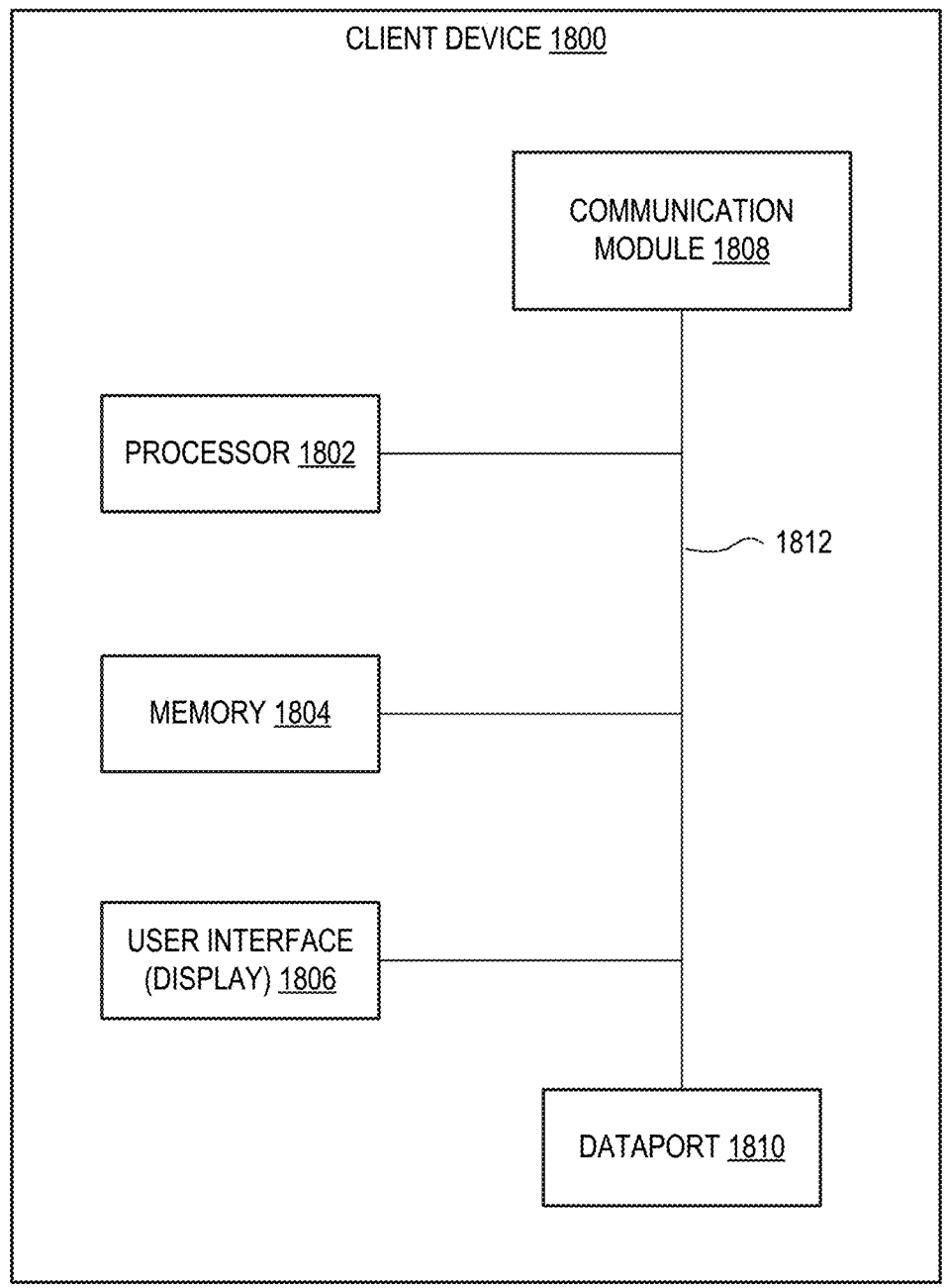
FIG. 18 is a functional block diagram of a client device on which certain embodiments may be implemented according to various aspects of the present disclosure.

FIG. 18 is a functional block diagram of a client device 1800 on which the present embodiments may be implemented according to various aspects of the present disclosure. The user's client device 1620 described with reference to FIG. 16 (and as such, the client device 130, 530, or 830) may include some or all of the components and/or functionality of the client device 1800. The client device 1800 may be, for example, a smartphone.

The client device 1800 includes a processor 1802, a memory 1804, a user interface 1806, a communication module 1808, and a dataport 1810. These components are communicatively coupled together by an interconnect bus 1812. The processor 1802 may include any processor used in smartphones and/or portable computing devices, such as an ARM processor (a processor based on the RISC (reduced instruction set computer) architecture developed by Advanced RISC Machines (ARM).). In certain embodiments, the processor 1802 includes one or more other processors, such as one or more microprocessors, and/or one or more supplementary co-processors, such as math co-processors.

The memory 1804 includes one or both of volatile memory, such as random access memory (RAM), as well as non-volatile memory, such as read-only memory (ROM), hard drives, flash memory, or any other suitable memory/storage element. The memory 1804 may include removable memory elements, such as a CompactFlash card, a MultiMediaCard (MMC), and/or a Secure Digital (SD) card. In certain embodiments, the memory 1804 includes a combination of magnetic, optical, and/or semiconductor memory, and may include, for example, RAM, ROM, flash drive, and/or a hard disk or drive. The processor 1802 and the memory 1804 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1802 may be connected to the memory 1804 via the dataport 1810.

The user interface 1806 may include any user interface or presentation elements suitable for a smartphone and/or a portable computing device, such as a keypad, a display screen, a touchscreen, a microphone, and a speaker. The communication module 1808 is configured to handle communication links between the client device 1800 and other, external devices or receivers, and to route incoming/outgoing data appropriately. For example, inbound data from the dataport 1810 may be routed through the communication module 1808 before being directed to the processor 1802, and outbound data from the processor 1802 may be routed through the communication module 1808 before being directed to the dataport 1810. The communication module 1808 may include one or more transceiver modules configured for communicating and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1810 may be any type of connector used for physically interfacing with a smartphone and/or a portable computing device, such as a mini-USB port or an IPHONE®/IPOD® 30-pin connector or LIGHTNING® connector. In other embodiments, the dataport 1810 may include multiple communication channels for simultaneous communication with, for example, other processors, servers, and/or client terminals.

The memory 1804 may store instructions for communicating with other systems, such as a computer. The memory 1804 may store, for example, a program (e.g., computer program code) adapted to direct the processor 1802 in accordance with the present embodiments. The instructions also may include program elements, such as an operating system. While execution of sequences of instructions in the program causes the processor 1802 to perform the process blocks described herein, hard-wired circuitry may be used in place of, or in combination with, software/firmware instructions for implementation of the processes of the present embodiments. Thus, the present embodiments are not limited to any specific combination of hardware and software.

System/Device

Figure 19:
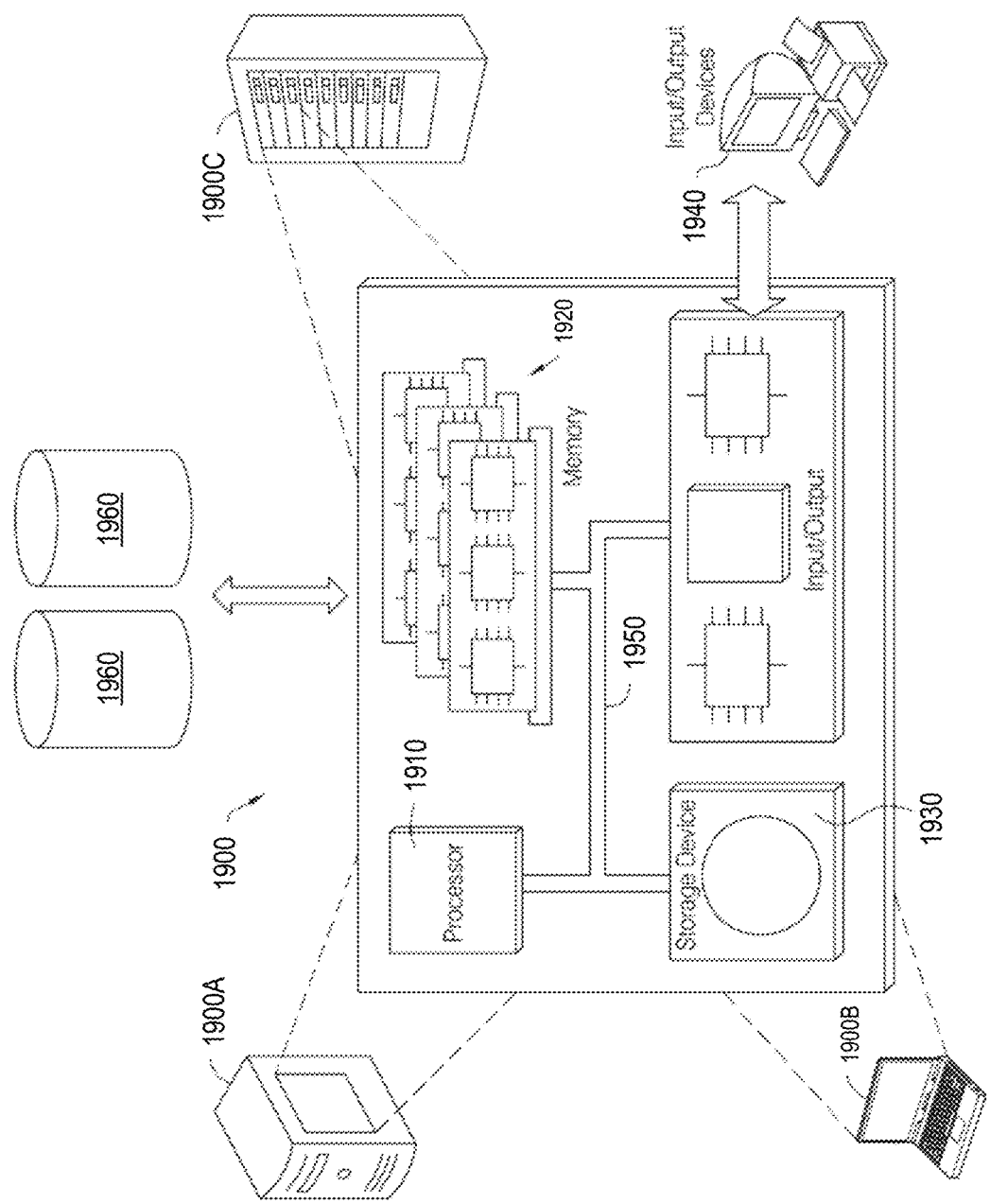
FIG. 19 is a functional block diagram of a system on which certain embodiments may be implemented according to various aspects of present disclosure.

FIG. 19 is a functional block diagram of a system 1900 on which the present embodiments may be implemented according to various aspects of the present disclosure. The computer system 1900 may be embodied in at least one of a personal computer (also referred to as a desktop computer) 1900A, a portable computer (also referred to as a laptop or notebook computer) 1900B, and/or a server 1900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1900 may execute at least some of the operations and processes described above. The computer system 1900 may include at least one processor 1910, a memory 1920, at least one storage device 1930, and input/output (I/O) devices 1940. Some or all of the components 1910, 1920, 1930, 1940 may be interconnected via a system bus 1950. The processor 1910 may be single- or multi-threaded and may have one or more cores. The processor 1910 may execute instructions, such as those stored in the memory 1920 and/or in the storage device 1930. Information may be received and output using one or more of the I/O devices 1940.

The memory 1920 may store information, and may be a computer-readable medium, such as volatile or non-volatile memory. The storage device(s) 1930 may provide storage for the computer system 1900, and may be a computer-readable medium. In various embodiments, the storage device(s) 1930 may be one or more of a flash memory device, a hard disk device, an optical disk device, a tape device, or any other type of storage device.

The I/O devices 1940 may provide input/output operations for the computer system 1900. The I/O devices 1940 may include a keyboard, a pointing device, and/or a microphone. The I/O devices 1940 may further include a display unit for displaying graphical user interfaces, a speaker, and/or a printer. External data may be stored in one or more accessible external databases 1960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method blocks may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to communicate data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Example Embodiments

Figure 20:
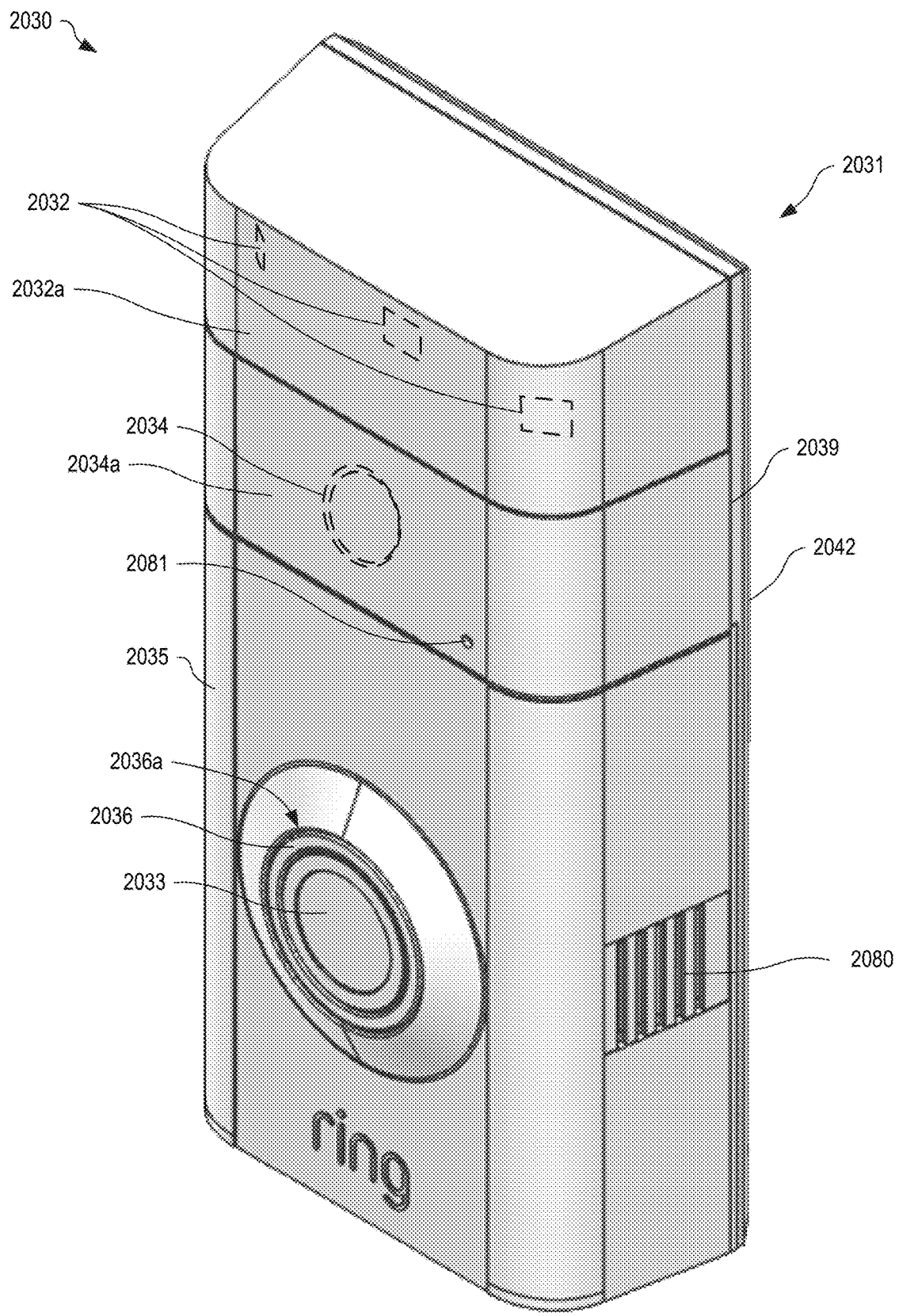
FIG. 20 is a front perspective view of the A/V device of FIG. 16 implemented as a doorbell, in an embodiment.

FIG. 20 is a front perspective view of a doorbell 2030 that represents one example implementation of the security device 1680 of FIG. 16, and the security device 102 described above, hereafter referred to as device 2030. The device 2030 has a housing 2031 that includes a backplate 2039, a faceplate 2035 with a button 2033, an optically-transparent lens 2034a positioned in front of a camera 2034, and an infrared-transparent lens 2032a positioned in front of at least one motion sensor 2032. The housing 2031 may be further configured with an aperture 2081 to allow sound to enter the housing 2031 for detection by a microphone. The device 2030 may also include a mounting bracket 2042 that couples with the backplate 2039 to facilitate mounting of the device 2030 on a flat surface, such as the exterior of a building, such as a home or office. For example, the mounting bracket 2042 may be selected for mounting to surfaces of various composition, including, without limitation, wood, concrete, stucco, brick, vinyl siding, aluminum siding, etc., with any suitable fasteners, such as screws, or interference connections, adhesives, etc. The device 2030 may couple to the mounting bracket 2042 using any suitable fasteners, such as screws, or interference connections, mating hooks and apertures, adhesives, etc. The backplate 2039 may include screw terminals configured to receive electrical wires adjacent a mounting surface of the device 2030. The device 2030 may receive electrical power through the screw terminals and/or the device 2030 may control electrical connectivity of the screw terminals to cause a conventional doorbell to sound if so connected to the wires.

The faceplate 2035 may extend from the bottom of the device 2030 up to just below the camera 2034. The faceplate 2035 may be formed of any suitable material, including, without limitation, metals, such as brushed aluminum or stainless steel, metal alloys, and plastics, and any combination thereof. The faceplate 2035 protects the internal event videos of the device 2030 and serves as an exterior front surface of the device 2030. The faceplate 2035 may include an aperture 2036a with a flexible translucent membrane 2036 for movably holding the button 2033. The faceplate 2035 is also formed with at least one speaker grille 2080 to allow sound generated within the housing 2031 to exit. The button 2033 and the flexible translucent membrane 2036 may have various profiles that may or may not match the profile of the faceplate 2035. The flexible translucent membrane 2036 may include any suitable material, including, without limitation, a transparent silicone, plastic, or rubber, that is configured for allowing light produced within the device 2030 to pass through and is sufficiently flexible to allow the button 2033 to be pressed. The light may be produced by one or more light-emitting components, such as light-emitting diodes (LEDs), contained within the device 2030, as further described below. The button 2033 and/or the flexible translucent membrane 2036 contacts a switch cover located within the device 2030 when the button 2033 is pressed by a visitor. When pressed, the button 2033 may trigger one or more functions of the device 2030, as further described below.

The motion sensor 2032 may be, for example, one or more passive infrared (PIR) sensors that detect motion using the infrared wavelength, but may be any type of sensor configured for detecting and communicating the presence of motion and/or a heat source within their field of view. The motion sensor 2032 may be configured to detect motion using any methodology, including but not limited to methodologies that do not rely on detecting the presence of a heat source within a field of view, without departing from the scope of the present embodiments. In certain embodiments, the infrared-transparent lens 2032a may be a Fresnel lens patterned to focus incoming light onto the at least one motion sensor 2032 located within the device 2030. The infrared transparent lens 2032a may be substantially coplanar with a front surface of the housing 2031. In alternative embodiments, the infrared-transparent lens 2032a may be recessed within the housing 2031 or may protrude outward from the housing 2031. The infrared-transparent lens 2032a may extend and curl partially around the side of the device 2030 without departing from the scope of the present embodiments. The at least one motion sensor 2032 is configured to sense a presence and/or motion of an object in front of the device 2030. In certain embodiments, the optically-transparent lens 2034a may be configured for focusing light into the camera 2034 so that clear images may be taken. The camera 2034 is configured for capturing video data when activated.

Floodlight Embodiment

Figure 21:
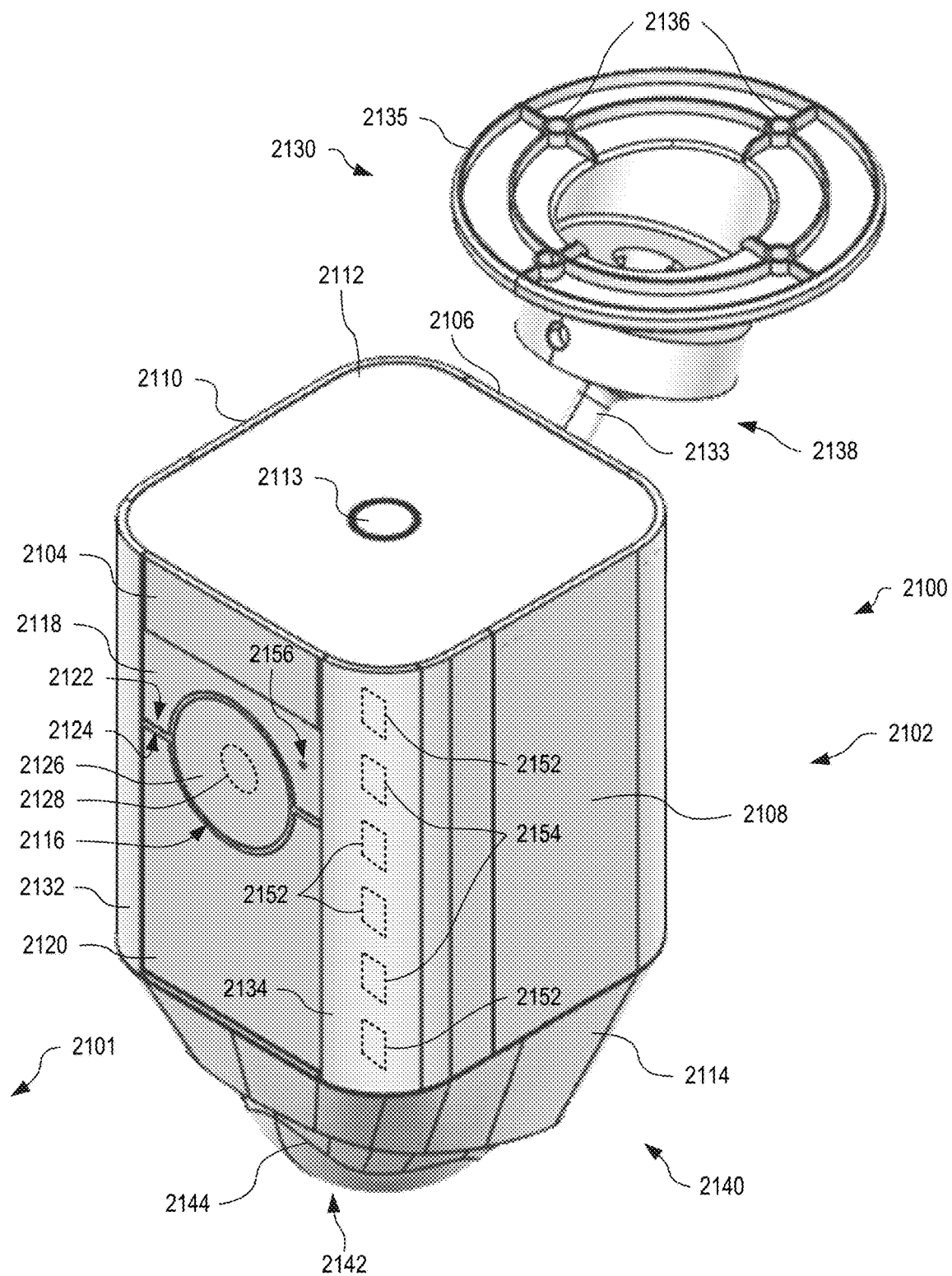
FIG. 21 is a front perspective view of the A/V device of FIG. 16 implemented as a security/floodlight controlling device, in an embodiment, in combination with mounting hardware.

FIG. 21 is a front perspective view of a security device 2100, that represents one example implementation of the security device 1680 of FIG. 16, and the security device 102 described above.

The security device 2100 is configured with a housing 2102 for containing and protecting the interior components of the security device 2100. The housing 2102 includes a front wall 2104, a rear wall 2106, opposing sidewalls 2108 (right), 2110 (left), an upper wall 2112, and a tapered lower portion 2114. The front wall 2104 forms a central opening 2116 that receives an upper shield 2118 and a lower grille 2120. In the illustrated embodiment, front surfaces of the upper shield 2118 and the lower grille 2120 are substantially flush with a front surface of the front wall 2104, but in alternative embodiments, these surfaces may not be flush with one another. The upper shield 2118 is substantially rectangular with a semicircular indentation along its lower edge 2122. The lower grille 2120 is substantially rectangular, and includes a semicircular indentation along its upper edge 2124. Together, the semicircular indentations in the upper shield 2118 and the lower grille 2120 form a circular opening that accommodates a cover 2126. The upper shield 2118, the lower grille 2120, and the cover 2126 are described in further detail below.

A camera 2128 is positioned behind the cover 2126 with a field of view of a monitored area 2101 to the front of the security device 2100 through the circular opening formed by the upper shield 2118 and the lower grille 2120. The cover 2126 is preferably transparent or translucent so that it does not interfere with the field of view of the camera 2128. For example, in certain embodiments the cover 2126 may include colorless glass or plastic.

The security device 2100 has a plurality of visible light emitting elements 2152 and infrared light emitting elements 2154 that are positioned behind right and left front corner shields 2132, 2134. For clarity of illustration, the visible light emitting elements 2152 and the infrared light emitting elements 2154 are shown only behind right corner shield 2134; the visible light emitting elements 2152 and the infrared light emitting elements 2154 are similarly positioned behind the left corner shield 2132. The corner shields 2132, 2134 may be formed of a material that is transparent to light within both the visible spectrum and the infrared spectrum. In certain embodiments, the corner shields 2132, 2134 are formed of a clear plastic (e.g., polycarbonate) or glass. The corner shields 2132, 2134, therefore, do not significantly interfere with transmission of light from the visible light emitting elements 2152 and the infrared light emitting elements 2154 into the monitored area 2101. The infrared light emitting elements 2154, in conjunction with operation of the camera 2128, facilitates night vision functionality of the security device 2100.

An input device 2113 is positioned on the upper wall 2112 of the housing 2102 such that it is accessible by the user. The input device 2113 may be, for example, a button connected to an electrical switch that provides an input to a processor of security device 2100.

The security device 2100 includes at least two microphones. The first microphone is positioned at the front of the security device 2100 and is aligned with a first microphone aperture 2156 within the upper shield 2118. The second microphone is positioned at the left side of the security device 2100 and is aligned with a second microphone aperture in the left sidewall 2110 of the housing 2102.

The tapered lower portion 2114 includes an opening to receive the motion sensor cover 2144, which is convexly shaped to cover and close the lower end opening of the tapered lower portion 2114. The motion sensor cover 2144 may include a Fresnel lens 2142 that is configured to focus and concentrate incoming infrared light onto a motion sensor (e.g., PIR sensors, now shown) located within the tapered lower portion 2114, thereby enhancing the effectiveness and/or sensitivity of the motion sensor. In alternative embodiments, the motion sensor cover 2144 may not include a Fresnel lens.

The motion sensor cover 2144 and the tapered lower portion 2114 couple with a plate to form a battery access door 2140 within the housing 2102 that provides access to removable battery casings configured within housing 2102. This configuration is well suited to a typical use case for the security device 2100, since floodlights are typically located above the head level of a person of average height. A person (or other object) moving at ground level within the monitored area 2101 is thus likely to be well within the field of view of the motion sensor.

The security device 2100 configured with coupling hardware 2130 that may be used to attach the security device 2100 to a supporting structure (not shown). For example, the coupling hardware 2130 may be used to secure the security device 2100 to a wall, a ceiling, a frame, a post, a gate, and so on. In the illustrated embodiment, the coupling hardware 2130 has a first connecting member 2133 secured to the rear wall 2106 of the housing 2102 and a second connecting member 2135 configured for securing to the supporting structure. For example, the second connecting member 2135 may include one or more apertures 2136 that allow the second connecting member 2135 to be screwed or nailed to the supporting structure. The first and second connecting members 2133, 2135 meet at a ball-and-socket joint 2138 that allows the first and second connecting members 2133, 2135 to articulate with respect to one another such that the security device 2100 may be oriented as desired. The ball-and-socket joint 2138 is, however, just one non-limiting example. In alternative embodiments, other types of joints may be provided between the first and second connecting members 2133, 2135, including non-articulating joints. In further alternative embodiments, the coupling hardware 2130 may include a single unitary member, rather than the first and second connecting members 2133, 2135.

In certain embodiments, the security device 2100 is configured to control an external illumination source that is capable of being reoriented, the external floodlights may work in conjunction with the integral illumination source (e.g., the visible light emitting elements 2152 and the infrared light emitting elements 2154) to illuminate a broader area around the security device 2100, thereby providing greater security and a larger area for video surveillance and recording. For example, the user may orient the security device 2100 such that the integral illumination source points straight ahead and reorient the external illumination source to point to the sides of the area illuminated by the integral illumination source, thereby illuminating a broader area.

In a first aspect, a method displays event video. An event message, indicating that a visitor has been detected by a security device configured within a predefined area, is received at a network-connected device that determines that a client device registered with the security device is within the predefined area. The event video is sent to the client device with a display command to control the client device to display the event video on a display of the client device without interaction by a user.

Certain embodiments of the first aspect further include determining that the client device is not within the predefined area, and sending the event message to the client device with the display command to control the client device to display the event message of the visitor at the security device on the display.

In certain embodiments of the first aspect, determining that the client device is within the predefined area includes determining that the client device is connected to a network connected to the security device.

In certain embodiments of the first aspect, the network uses a wireless protocol implemented by a network hub located in wireless communication range of the security device.

In certain embodiments of the first aspect, determining that the client device is within the predefined area includes receiving a current geographic location of the client device from the client device, and determining that the current geographic location is within the predefined area.

In certain embodiments of the first aspect, the event video is a live video stream from the security device.

In certain embodiments of the first aspect, the predefined area corresponds to one of a residence configured with the security device and a neighborhood containing the residence.

In a second aspect, a method for displaying event video includes receiving an event video stream of a visitor at a security device from the security device, determining that a user-configurable flag indicates automatic full-screen playback of the event video on a client device registered to the security device, and transmitting the event video and a display command, defining automatic full-screen playback of the event video on the client device without user interaction, to a client device.

In certain embodiments of the second aspect, the user-configurable flag is set automatically when the security device and client device are co-located.

Certain embodiments of the second aspect further include determining that the security device and client device are co-located when the client device is connected to a wireless network that also connects to the security device.

Certain embodiments of the second aspect further include determining that the security device and client device are co-located when a current geographic location received from the client device is within a predefined area that includes the security device.

In certain embodiments of the second aspect, the predefined area corresponds to one of a residence configured with the security device and a neighborhood containing the residence.

In certain embodiments of the second aspect, the event video is a live video stream received from the security device.

In a third aspect, a method displays event video. A network-connected device receives an event video of a visitor at a security device from the security device. The network-connected device determines that the visitor is unexpected and generates a display command to control a client device registered with the security device to receive the event video from the network-connected device for immediate display on the client device without user interaction at the client device.

In certain embodiments of the third aspect, determining that the visitor is unexpected includes retrieving information defining unexpected or expected designations of previously identified persons from a back-end server.

In certain embodiments of the third aspect, determining that the visitor is unexpected includes isolating a face of the visitor from the event video, and determining that the isolated face of the visitor matches a facial image of a person having previous unexpected action.

Certain embodiments of the third aspect further include: retrieving the facial image of the person having previous unexpected behavior from a database of facial images extracted from video clips of persons indicated as having unexpected behavior captured within a neighborhood including the security device.

In certain embodiments of the third aspect, determining that the visitor is unexpected includes isolating a face of the visitor from the event video, and comparing the isolated face of the visitor to previously captured facial images associated with the security device. The visitor is deemed unexpected when the isolated face of the visitor does not match any of the previously captured facial images.

In certain embodiments of the third aspect, determining that the visitor is unexpected includes processing, by the network-connected device, the event video using a classification engine to generate a classification indicative of behavior of the visitor in the live video, and determining that the visitor is unexpected when the classification indicates unexpected action.

In certain embodiments of the third aspect, the classifier engine includes a convolutional neural network trained to recognize the unexpected action.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the blocks in the processes described herein need not be performed in the same order as they have been presented, and may be performed in any order(s). Further, blocks that have been presented as being performed separately may in alternative embodiments be performed concurrently. Likewise, blocks that have been presented as being performed concurrently may in alternative embodiments be performed separately.

Changes may be made in the above embodiments without departing from the scope of the present embodiments. The matter contained in the above description and/or shown in the accompanying drawings should be interpreted as illustrative and not in a limiting sense. The following claims are intended to cover all generic and specific features described herein, as well as all statements of the scope of the present embodiments, which, as a matter of language, might be said to fall therebetween.

What is claimed is:

1. A method for displaying event video, the method comprising:
   receiving, at a network-connected device, an event message indicating that a visitor has been detected by a security device configured within a predefined area;
   determining that a client device registered with the security device is within the predefined are;
   generating a display command defining one of:
      automatic full-screen display of the event video on the client device when the client device is within the predefined area,
      automatic partial-screen display of the event video on the client device when the client device is not within the predefined area, and
      user-configured automatic full-screen or partial-screen display of the event video based upon a user-configurable flag defined by a user of the client device; and
   sending the event video to the client device with the display command to control the client device to automatically display the event video on a display of the client device in full-screen display or partial-screen display without interaction by the user.

2. The method of claim 1, further comprising:
   receiving, at the network-connected device, another event message indicating that another visitor has been detected by the security device;
   determining that the client device is not within the predefined area; and
   sending the event message to the client device with the display command to control the client device to display the event message of the visitor at the security device on the display.

3. The method of claim 1, wherein determining that the client device is within the predefined area comprises determining that the client device is connected to a network to which the security device is also connected.

4. The method of claim 1, wherein determining that the client device is within the predefined area comprises:
   receiving a current geographic location of the client device from the client device; and
   determining that the current geographic location is within the predefined area.

5. The method of claim 1, the event video being a live video from the security device.

6. The method of claim 1, wherein the predefined area corresponds to one of a residence configured with the security device and a neighborhood containing the residence.

7. The method of claim 3, wherein the network uses a wireless protocol implemented by a network hub located in wireless communication range of the security device.

8. A method for displaying event video, the method comprising:
- receiving, from a security device, an event video of a visitor at the security device;
- identifying a condition with respect to 1) the event video or 2) a client device registered to the security device;
- defining a display command of the event video, the display command defining:
  - automatic full-screen display of the event video on the client device when the condition is a first condition,
  - automatic partial-screen display of the event video on the client device when the condition is a second condition different from the first condition, and
  - user-configured full-screen or partial-screen display based on a user-configurable flag;
- determining that the user-configurable flag indicates automatic full-screen display of the event video on the client device; and
- transmitting, to the client device registered to the security device, the event video including the display command.

9. The method of claim 8, wherein at least one of the first condition and the second condition is user-configurable, and one of the first condition or the second condition is met when the security device and the client device are co-located.

10. The method of claim 9, further comprising determining that the security device and client device are co-located when the client device is connected to a wireless network to which the security device is also connected.

11. The method of claim 9, further comprising determining that the security device and client device are co-located when a current geographic location received from the client device is within a predefined area that includes the security device.

12. The method of claim 11, wherein the predefined area corresponds to one of a residence configured with the security device and a neighborhood containing the residence.

13. The method of claim 8, the event video being a live video received from the security device.

14. A method for displaying event video, the method comprising:
- receiving, at a network-connected device and from a security device, an event video of a visitor at the security device;
- determining that the visitor is one of unexpected or expected; and
- generating a display command to control a client device registered with the security device to receive the event video from the network-connected device for immediate display on the client device without user interaction at the client device, the immediate display being full-screen on the client device when the visitor is unexpected and partial-screen on the client device when the visitor is expected.

15. The method of claim 14, wherein the determining that the visitor is unexpected comprises retrieving information defining unexpected or expected designations of previously identified persons from a back-end server.

16. The method of claim 14, wherein determining that the visitor is unexpected comprises:
- isolating a face of the visitor from the event video; and
- determining that the isolated face of the visitor matches a facial image of a person having previous unexpected behavior.

17. The method of claim 16, further comprising retrieving the facial image of the person having previous unexpected behavior from a database of facial images extracted from video clips of persons indicated as having unexpected behavior captured within a neighborhood including the security device.

18. The method of claim 14, wherein determining the visitor is unexpected comprises:
- isolating a face of the visitor from the event video; and
- comparing the isolated face of the visitor to previously captured facial images associated with the security device;
- wherein the visitor is deemed unexpected when the isolated face of the visitor does not match any of the previously captured facial images.

19. The method of claim 14, wherein determining that the visitor is unexpected comprises:
- processing, by the network-connected device, the event video using a classification engine to generate a classification indicative of behavior of the visitor in the live video; and
- determining that the visitor is unexpected when the classification indicates unexpected action.

20. The method of claim 19, the classifier engine including a convolutional neural network trained to recognize the unexpected action.

* * * * *

UNITED STATES PATENT AND TRADEMARK OFFICE
CERTIFICATE OF CORRECTION

PATENT NO. : 10,777,055 B1  
APPLICATION NO. : 16/269497  
DATED : September 15, 2020  
INVENTOR(S) : Jessica Star Page 1 of 1

It is certified that error appears in the above-identified patent and that said Letters Patent is hereby corrected as shown below:

In the Claims

At Column 46, Line 22: "the predefined are" should read --the predefined area--;

At Column 48, Line 43: "the classifier engine" should read --the classification engine--.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*